United States Patent
Abe et al.

(10) Patent No.: US 9,548,486 B2
(45) Date of Patent: Jan. 17, 2017

(54) BATTERY

(71) Applicant: Sony Corporation, Tokyo (JP)

(72) Inventors: Tomohiro Abe, Fukushima (JP);
Motomi Suzuki, Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/218,662

(22) Filed: Jul. 25, 2016

(65) Prior Publication Data

US 2016/0336571 A1 Nov. 17, 2016

Related U.S. Application Data

(63) Continuation of application No. 14/281,144, filed on May 19, 2014, now Pat. No. 9,412,997.

(30) Foreign Application Priority Data

May 31, 2013 (JP) .................................. 2013-116059

(51) Int. Cl.
*H01M 2/16* (2006.01)
*H01M 4/131* (2010.01)
(Continued)

(52) U.S. Cl.
CPC .......... *H01M 4/131* (2013.01); *B60L 11/1809* (2013.01); *B60L 11/1851* (2013.01); *H01M 2/1673* (2013.01); *H01M 4/136* (2013.01); *H01M 4/525* (2013.01); *H01M 2/145* (2013.01); *H01M 10/052* (2013.01);
(Continued)

(58) Field of Classification Search
CPC ............. B60L 11/1809; B60L 11/1851; H01M 10/052; H01M 10/425; H01M 10/486; H01M 2004/021; H01M 2004/028; H01M 2200/106; H01M 2220/20; H01M 2/145; H01M 2/1673; H01M 4/131; H01M 4/136; H01M 4/525; Y02E 60/122; Y02T 10/7005; Y02T 90/16
See application file for complete search history.

(56) References Cited

U.S. PATENT DOCUMENTS 6,203,902 B1 * 3/2001 Ota .................... B29C 55/00
428/359
2014/0356695 A1 12/2014 Abe et al.

FOREIGN PATENT DOCUMENTS

JP   H08-37007 A      2/1996
JP   2001-068088 A    3/2001
(Continued)

OTHER PUBLICATIONS

Japanese Office Action issued Sep. 6, 2016 in corresponding Japanese application No. 2013-116059 (4 pages).

*Primary Examiner* — Patrick Ryan
*Assistant Examiner* — Ben Lewis
(74) *Attorney, Agent, or Firm* — K&L Gates LLP

(57) ABSTRACT

A battery is provided. The battery includes a positive electrode including a positive electrode active material layer provided on a positive electrode current collector; a negative electrode; and a separator at least including a porous film, wherein the porous film has a porosity $\epsilon$ [%] and an air permeability t [sec/100 cc] which satisfy formulae of:

$$t = a \times \mathrm{Ln}(\epsilon) - 4.02a + 100 \text{ and } -1.87 \times 1010 \times S - 4.96 \le a \le -40$$

wherein S is the area density of the positive electrode active material layer [mg/cm2] and Ln is natural logarithm.

29 Claims, 12 Drawing Sheets

(51) Int. Cl.
*H01M 4/136* (2010.01)
*B60L 11/18* (2006.01)
*H01M 4/525* (2010.01)
H01M 2/14 (2006.01)
H01M 10/48 (2006.01)
H01M 4/02 (2006.01)
H01M 10/42 (2006.01)
H01M 10/052 (2010.01)

(52) U.S. Cl.
CPC ........ *H01M 10/425* (2013.01); *H01M 10/486* (2013.01); *H01M 2004/021* (2013.01); *H01M 2004/028* (2013.01); *H01M 2200/20* (2013.01); *Y02E 60/122* (2013.01); *Y02T 10/7011* (2013.01)

(56) References Cited

FOREIGN PATENT DOCUMENTS

| | | |
|---|---|---|
| JP | 2005-293950 A | 10/2005 |
| JP | 2008-152985 A | 7/2008 |
| JP | 2009-146612 A | 7/2009 |
| JP | 2011-070994 A | 4/2011 |
| JP | 2011-175933 A | 9/2011 |
| JP | 2013-051078 A | 3/2013 |

\* cited by examiner

BATTERY

CROSS-REFERENCE TO RELATED APPLICATIONS

The present application is a continuation of U.S. application Ser. No. 14/281,144, filed May 19, 2014, which claims priority to Japanese Application No. 2013-116059, filed May 31, 2013, the entire contents of each of which are hereby incorporated herein by reference.

BACKGROUND

The present disclosure relates to a battery, a battery pack, an electronic apparatus, an electric vehicle, an electrical storage apparatus and an electricity system.

There has been a growing demand for secondary batteries such as lithium-ion secondary batteries having high performance. Enhancement of battery characteristics including high capacity and high power has been demanded. For example, some technologies related to a separator of a secondary battery have been disclosed in Japanese Patent Application Laid-Open Nos. 2001-68088 and 2008-152985 (hereinafter referred to as "Patent Document 1" and "Patent Document 2", respectively); and some technologies related to secondary batteries with high power have been disclosed in Japanese Patent Application Laid-Open Nos. 2009-146612 and 2011-175933.

SUMMARY

Typically, in batteries, both high capacity and high power have been demanded.

In view of the above-mentioned circumstances, it is desirable to provide a battery capable of achieving both high capacity and high power, and a battery pack, an electronic apparatus, an electric vehicle, an electrical storage apparatus and an electricity system, in each of which the battery is applied.

According to an embodiment of the present disclosure, there is provided a battery including a positive electrode, a negative electrode, a separator at least including a porous film, and an electrolyte. The positive electrode includes a positive electrode current collector having a pair of surfaces, and a positive electrode active material layer provided on each of the surfaces of the positive electrode current collector. The positive electrode active material layer contains a positive electrode active material. The positive electrode active material has at least one compound selected from the group consisting of: a lithium nickel composite oxide having nickel as a main component, the lithium nickel composite oxide having a layer structure, the lithium nickel composite oxide containing at least lithium and nickel with a high content of nickel; a lithium nickel cobalt manganese composite oxide having a layer structure, the lithium nickel cobalt manganese composite oxide containing at least lithium, nickel, cobalt and manganese with a low content of nickel; a lithium manganese composite oxide having a spinel structure, the lithium manganese composite oxide containing at least lithium and manganese; and a lithium iron phosphate compound having an olivine structure, the lithium iron phosphate compound containing at least lithium, iron and phosphorus. The positive electrode active material layer has an area density S [mg/cm$^2$] more than or equal to 30 mg/cm$^2$. The porous film has a porosity ε [%] and an air permeability t [sec/100 cc] which satisfy the following formulae:

$$t = a \times \mathrm{Ln}(\epsilon) - 4.02a + 100$$

and $$-1.87 \times 10^{10} \times S^{-4.96} \leq a \leq -40$$

where ε is the porosity [%], t is the air permeability [sec/100 cc], S is the area density of the positive electrode active material layer [mg/cm$^2$] and Ln is natural logarithm.

According to still other embodiments of the present disclosure, there is provided a battery pack, an electronic apparatus, an electric vehicle, an electrical storage apparatus and an electricity system, having the above-described battery.

According to the present disclosure, it is possible to achieve both high capacity and high power of a battery.

These and other objects, features and advantages of the present disclosure will become more apparent in light of the following detailed description of best mode embodiments thereof, as illustrated in the accompanying drawings.

Additional features and advantages are described herein, and will be apparent from the following Detailed Description and the figures.

DETAILED DESCRIPTION

Figure 1:
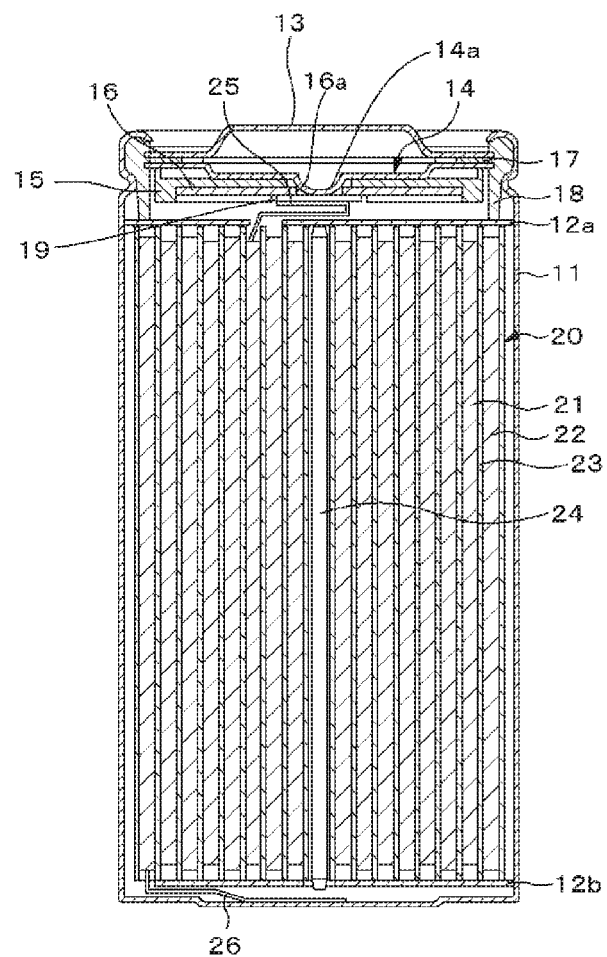
FIG. 1 is a cross-sectional view showing an example of a secondary battery according to a first embodiment of the present disclosure.

Hereinafter, embodiments of the present disclosure will be described with reference to the drawings. The description will be given in the following order:

1. First Embodiment (example of battery)
2. Second Embodiment (example of battery pack)
3. Third Embodiment (example of power storage system etc.)
4. Other embodiments (variation examples)

By way of non-limiting illustration, concrete examples of certain embodiments of the present disclosure are given below. It should be noted that the effects illustrated herein are non-limitative examples. An embodiment of the present disclosure may have an effect other than those illustrated herein.

1. First Embodiment

Technical Background

First, to facilitate understanding of the present disclosure, a technical background related to the present disclosure will be described. For example, in order to realize high capacity and high power of a battery such as a lithium-ion secondary battery with a rated size such as 18650-type (diameter of 18 mm and length of 65 mm); the greater the current density, the greater the total amount of lithium ions moving through fine pores of a separator per unit time (that is, an amount of electricity).

The movement of lithium ions in a system where the current density has become relatively large will take place dominantly in a part with the lowest transfer resistance. Therefore, a separator which has unequal conductivity may generate overvoltage due to a local imbalance in the current density. The generation of overvoltage would cause decomposition of an electrolyte solution which may give rise to a coating and result in an increase in inner resistance. Consequently, there are some cases where it is difficult to achieve high-power.

For example, some separators described in the above-described Patent Documents 1 and 2 are those obtained from subjecting a microporous film such as a polyethylene film to: sulfonation treatment, fluorination treatment, corona treatment or the like. In such separators, uniformity of the treatment may be a significant factor; in cases where the treatment is performed non-uniformly, the resulting separator would have unequal conductivity, which leads to an increase in inner resistance and makes it difficult to achieve high-power.

To achieve high capacity within a rated size, typically, a thickness of an electrode may be increased. In such a case, an amount of lithium ions contributing to the reaction, per unit area of the electrode, tends to increase. Therefore, unless a suitable separator is selected, the lithium ions discharged from the positive electrode may not be well-spread on the surface of the negative electrode. This may generate an overvoltage, which leads to decomposition of the electrolyte solution and thus allows a coating-forming reaction to proceed. Since this leads to an increase in inner resistance, it would be difficult to realize both high capacity and high power at the same time.

Under such circumstances, the present inventors intensively studied to discover that an increase in inner resistance can be suppressed and both high capacity and high power can be realized; by using a separator satisfying a predetermined structure, in the cases where an area density of a positive electrode active material layer is set to more than or equal to 30 mg/cm$^2$ and high-capacity of the battery is realized.

In the following, a battery capable of achieving both high capacity and high power, according to a first embodiment of the present disclosure, will be described in detail.

[Configuration of Battery]

Referring to FIG. 1, a structure of a battery according to the first embodiment of the present disclosure will be described. FIG. 1 is a cross-sectional view showing an example of a battery according to the first embodiment of the present disclosure. The battery according to the first embodiment of the present disclosure may be, for example, a non-aqueous electrolyte battery. This may be, for example, a chargeable and dischargeable non-aqueous electrolyte secondary battery. This may also be, for example, a lithium-ion secondary battery. This battery is a so-called cylinder-type battery, and includes a battery can 11 having a shape of approximately hollow cylinder. The battery has a non-aqueous electrolyte solution which is an electrolyte in the form of a liquid (not shown) and a spirally wound electrode body 20 contained inside the battery can 11. The spirally wound electrode body 20 has a strip-shaped positive electrode 21 and a strip-shaped negative electrode 22 which are spirally wound interposing a separator 23 between them.

The battery can 11 may be made of, for example, iron plated with nickel. The battery can 11 may have a structure with its one end open and other end closed. In the battery can 11, a pair of insulating plates 12a and 12b may be arranged in the positions sandwiching the spirally wound electrode body 20 in a vertical direction with respect to the winding peripheral surface of the spirally wound electrode body 20.

Examples of materials of the battery can 11 include iron (Fe), nickel (Ni), stainless steel (SUS), aluminum (Al), titanium (Ti) and the like. The battery can 11 may also be, for example, plated with a material such as nickel, in order to prevent electrochemical corrosion by the non-aqueous electrolyte solution which might follow charge and discharge of the battery. In an open end of the battery can 11, a battery lid 13 which is a positive electrode lead plate, and, a safety valve mechanism and a positive temperature coefficient device (PTC device) 17 provided at an inner side of the battery lid 13 are mounted by being caulked with a gasket 18 for insulating and sealing.

The battery lid 13 is, for example, made of a material similar to that of the battery can 11. The battery lid 13 may be provided with an opening for discharging a gas generated inside the battery. The safety valve mechanism may have a safety valve 14, a disc holder 15 and a cut-off disc 16 which are stacked in this order. A protruding portion 14a of the safety valve 14 may be connected to a positive electrode lead 25 which is protruded from the spirally wound electrode body 20 through a sub-disc 19 being disposed to cover a hole portion 16a formed in the center of the cut-off disc 16. By connecting the safety valve 14 and the positive electrode lead 25 to each other through the sub-disc 19, it is possible to prevent the positive electrode lead 25 from being drawn from the hole portion 16a when the safety valve 14 is inverted. In addition, the safety valve mechanism may be electrically connected to the battery lid 13 through the PTC device 17.

In the safety valve mechanism, when a battery inner pressure becomes a predetermined value or more due to a battery inner short circuit or a heating from the outside of the battery, the safety valve 14 would be inverted. This allows the protruding portion 14a and the battery lid 13 to be electrically disconnected from the spirally wound electrode body 20. That is, when the safety valve 14 is inverted, the positive electrode lead 25 would be pressed by the cut-off disc 16 so that a connection between the safety valve 14 and the positive electrode lead 25 would be released. The disc holder 15 may be made of an insulating material. When the safety valve 14 is inverted, the safety valve 14 and the cut-off disc 16 would thus be insulated.

In addition, when a gas is generated inside the battery, and the battery internal pressure is further increased, a part of the safety valve 14 may break so that the gas can be discharged to the battery lid 13 side.

In addition, for example, a plurality of gas discharge holes (not shown) may be provided at the periphery of the hole portion 16a of the cut-off disc 16 so that in a case where a gas is generated from the spirally wound electrode body 20, the gas can be effectively discharged to the battery lid 13 side.

A resistance value in the PTC element 17 may increase when a temperature is raised. This would allow the battery lid 13 and the spirally wound electrode body 20 to be electrically disconnected; and by thus cutting off the current, it may prevent abnormal generation of heat due to excessive current flow. The gasket 18 may be made of, for example, an insulating material. A surface of the gasket 18 may be coated with asphalt.

The spirally wound electrode body 20, housed inside the battery, may be spirally wound about a center pin 24. The spirally wound electrode body 20 may be formed by laminating the positive electrode 21 and the negative electrode 22 in this order interposing a separator 23 between them; and being spirally wound in a longitudinal direction.

The positive electrode lead 25 and a negative electrode lead 26 may be connected to the positive electrode 21 and the negative electrode 22, respectively. The positive electrode lead 25 may be welded to the safety valve 14, to be electrically connected to the battery lid 13, as described above. The negative electrode lead 26 may be welded to the battery can 11, to be electrically connected to the battery can 11.

Figure 2:
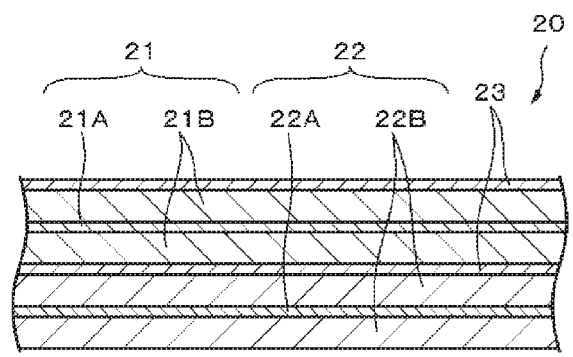
FIG. 2 is an enlarged cross-sectional view showing a part of the spirally wound electrode body shown in FIG. 1.

FIG. 2 is an enlarged cross-sectional view showing a part of the spirally wound electrode body 20 shown in FIG. 1. In the battery according to the first embodiment of the present disclosure, an area density S [$mg/cm^2$] of a positive electrode active material layer 21B is set to more than or equal to 30 $mg/cm^2$; and the separator 23 has a predetermined structure.

In the following, the positive electrode 21, the negative electrode 22 and the separator 23 will be described in detail.

[Positive Electrode]

The positive electrode 21 has, for example, a positive electrode current collector 21A having one principal surface and another principal surface, and a double-side deposited portion including a positive electrode active material layer 21B provided on each of both of the surfaces of the positive electrode current collector 21A. Although not shown, the positive electrode 21 may otherwise have a single-side deposited portion including the positive electrode active material layer 21B provided on only one of the surfaces of the positive electrode current collector 21A. The positive electrode current collector 21A may be made of, for example, metallic foil such as aluminum foil.

The positive electrode active material layer 21B may include, as positive electrode active material, one or more kinds of positive electrode materials capable of intercalating and deintercalating lithium. The positive electrode active material layer 21B may further include other materials such as a binding agent and a conducting agent, as necessary.

As the positive electrode material, a positive electrode active material which is suitable for high power use may be employed. Such a positive electrode active material may include at least one compound selected from the group consisting of: a lithium nickel composite oxide having nickel as a main component and having a layer structure; a lithium nickel cobalt manganese composite oxide having a layer structure; a lithium manganese composite oxide having a spinel structure; and a lithium iron phosphate compound having an olivine structure. It should be noted that a lithium cobalt oxide ($LiCoO_2$) and other composite oxides that contain cobalt, have a layer structure but do not substantially contain nickel, may not be suitable for high power use; because of their characteristics of generating a large amount of heat during high-load discharge.

The lithium nickel composite oxide having nickel as a main component and having a layer structure is a lithium nickel composite oxide that has a layer structure, has a high content of nickel, and contains at least lithium and nickel. As used herein, having a high content of nickel means, for example, containing nickel of more than or equal to 50% by molar fraction, with respect to constituent elements of the lithium nickel composite oxide (constituent elements other than lithium and oxygen; and if any halogen element is contained therein, those further excluding the halogen element).

The lithium nickel cobalt manganese composite oxide having a layer structure is a lithium nickel cobalt manganese composite oxide that has a layer structure, has a low content of nickel, and contains at least lithium, nickel, cobalt and manganese. As used herein, having a low content of nickel means, for example, containing nickel of less than or equal to 50% by molar fraction, with respect to constituent elements of the lithium nickel cobalt manganese composite oxide (constituent elements other than lithium and oxygen; and if any halogen element is contained therein, those further excluding the halogen element).

The lithium manganese composite oxide having a spinel structure is a lithium manganese composite oxide that has a spinel structure and contains at least lithium and manganese.

The lithium iron phosphate compound having an olivine structure is a lithium iron phosphate compound that has an olivine structure and contains at least lithium, iron and phosphorus.

Examples of the lithium nickel composite oxide having nickel as a main component and having a layer structure may include composite oxides which can be represented by the following formula (1).

$$Li_xNi_yCo_zM1_{(1-y-z)}O_b \qquad (1)$$

(In this formula (1), M1 represents at least one element selected from the group consisting of boron (B), magnesium (Mg), aluminum (Al), silicon (Si), phosphorus (P), sulfur (S), titanium (Ti), chromium (Cr), manganese (Mn), iron (Fe), copper (Cu), zinc (Zn), gallium (Ga), germanium (Ge), yttrium (Y), zirconium (Zr), molybdenum (Mo), silver (Ag), barium (Ba), tungsten (W), indium (In), tin (Sn), lead (Pb) and antimony (Sb). In the formula, x, y, z and b are values within ranges of $0.8<x\leq1.2$, $0.5\leq y\leq1.0$, $0\leq Z\leq0.5$, $y+z\leq1$ and $1.8\leq b\leq2.2$. It should be noted that the composition of lithium varies depending on the charging and discharging state, and the value of x indicates the value in the fully-discharged state.)

Specific examples of the composite oxides of the formula (1) include $Li_xNi_{0.80}Co_{0.15}Al_{0.05}O_2$ (where x means the same as the above); $Li_xNi_{0.5}Co_{0.2}Mn_{0.3}O_2$ (where x means the same as the above); $Li_xNi_{0.7}Co_{0.1}Mn_{0.2}O_2$ (where x means the same as the above), and the like.

Examples of the lithium nickel cobalt manganese composite oxide may include composite oxides which can be represented by the following formula (2).

$$Li_fNi_gCo_iMn_{(1-g-i-h)}M2_hO_{(2-j)} \qquad (2)$$

(In this formula (2), M2 represents at least one element selected from the group consisting of magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr) and tungsten (W). In the formula, f, g, h, j and i are values within ranges of $0.8\leq f\leq1.2$, $0<g\leq0.5$, $0\leq h\leq0.5$, $g+h+i<1$, $-0.1\leq j\leq0.2$ and $0<i\leq0.5$. It should be noted that the composition of lithium varies depending on the charging and discharging state, and the value of f indicates the value in the fully-discharged state.)

Specific examples of the composite oxides of the formula (2) include $Li_fNi_{1/3}Co_{1/3}Al_{1/3}O_2$ (where f means the same as the above) and the like.

Examples of the lithium manganese composite oxide having a spinel structure may include composite oxides which can be represented by the following formula (3).

$$Li_vNi_{(2-w)}M3_wO_s \qquad (3)$$

(In this formula (3), M3 represents at least one element selected from the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W). In the formula, v, w and s are values within ranges of $0.9\leq v\leq1.1$, $0\leq w\leq0.6$ and $3.7\leq s\leq4.1$. It should be noted that the composition of lithium varies depending on the charging and discharging state, and the value of v indicates the value in the fully-discharged state.)

Specific examples of the composite oxides of the formula (3) include $Li_vMn_2O_4$ (where v means the same as the above) and the like.

Examples of the lithium iron phosphate compound having an olivine structure may include phosphate compounds which can be represented by the following formula (4).

$$Li_uFe_rM4_{(1-r)}PO_4 \qquad (4)$$

(In this formula (4), M4 represents at least one element selected from the group consisting of cobalt (Co), manganese (Mn), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W) and zirconium (Zr). In the formula, r and u are values within ranges of $0<r\leq1$ and $0.9\leq u\leq1.1$. It should be noted that the composition of lithium varies depending on the charging and discharging state, and the value of u indicates the value in the fully-discharged state.)

Specific examples of the phosphate compounds of the formula (4) include $Li_uFePO_4$ (where u means the same as the above) and the like.

[Composition of Positive Electrode Material]

Desirably, the positive electrode material may contain $Li_xNi_{0.80}Co_{0.15}Al_{0.05}O_2$ (where x means the same as the above) as the lithium nickel composite oxide having nickel as a main component and having a layer structure. In this case, a content of $Li_xNi_{0.80}Co_{0.15}Al_{0.05}O_2$ (where x means the same as the above) may desirably be 80% by mass or more and 98% by mass or less of a total mass of the positive electrode material. When the content of $Li_xNi_{0.80}Co_{0.15}Al_{0.05}O_2$ (where x means the same as the above) is in this range, it may make it possible to realize a battery with higher capacity and also to achieve a sufficiently high power.

Desirably, for example, the positive electrode material may be a mixture of the lithium nickel cobalt manganese composite oxide having a layer structure and the lithium manganese composite oxide having a spinel structure. A mass ratio of "a mass of the lithium nickel cobalt manganese composite oxide having a layer structure:a mass of the lithium manganese composite oxide having a spinel structure" in the mixture may desirably be in a range of from 5:5 to 9:1. When the mass ratio of the mixture is in this range, it may make it possible to realize a battery with higher capacity, and suppress an increase in inner resistance of the battery after repeating charge-discharge cycles.

Desirably, for example, the positive electrode material may otherwise be the lithium nickel composite oxide having nickel as a main component and having a layer structure, or, a mixture of this lithium nickel composite oxide and the lithium manganese composite oxide having a spinel structure (referred herein to as a "particular positive electrode active material"). A mass ratio of "a mass of the lithium nickel composite oxide having nickel as a main component and having a layer structure:a mass of the lithium manganese composite oxide having a spinel structure" in this particular positive electrode active material may desirably be in a range of from 5:5 to 10:1. By adding the lithium manganese composite oxide, it may make it possible to suppress an increase in inner resistance of the battery after repeating charge-discharge cycles. When the mass ratio is in this range, it may make it possible to realize a battery with higher capacity.

[Conducting Agent]

Examples of materials that can be used as the conducting agent include carbon materials such as carbon black and graphite.

[Binding Agent]

Examples of materials that can be used as the binding agent include resin materials such as polyvinylidene fluoride (PVdF), polytetrafluoroethylene (PTFE), polyacrylonitrile (PAN), styrene-butadiene rubber (SBR) and carboxymethyl cellulose (CMC); and at least one material selected from copolymers, or the like, having one or more of these resin materials as a main component.

[Area Density of Positive Electrode Active Material Layer]

The positive electrode active material layer 21B may have its area density S [mg/cm$^2$] set to, for example, more than or equal to 30 mg/cm$^2$, from the viewpoint of realization of high capacity. Incidentally, when the area density S [mg/cm$^2$] of the positive electrode active material layer 21B is increased in such a manner, typically, an amount of lithium ions contributing to the reaction per unit area of the electrode would tend to increase. Therefore, it is desirable to employ a separator having a predetermined structure according to an embodiment of the present disclosure; or otherwise, it might have led to an increase in inner resistance, which would make it difficult to realize both high capacity and high power at the same time.

It should be noted that the area density S [mg/cm$^2$] of the positive electrode active material layer 21B would be a total mass per area (1 cm$^2$) of the positive electrode active material layer 21B of one side and the positive electrode active material layer 21B of the other side, of a part (the double-side deposited portion) in which the positive electrode active material layers 21B are provided on both of the surfaces of the positive electrode current collector 21A. The area density S [mg/cm$^2$] of the positive electrode active material layer 21B may be, for example, measured in the following manner.

[Method for Measuring Area Density S [Mg/Cm$^2$] of Positive Electrode Active Material Layer]

After allowing the battery to be fully-discharged, the battery is disassembled so that a positive electrode plate (positive electrode 21) thereof can be taken out. The positive electrode plate is washed with a solvent (for example, DMC (dimethyl carbonate) or the like) and then sufficiently dried. The part (the double-side deposited portion), in which the positive electrode active material layers 21B are provided on both of the surfaces of the positive electrode current collector 21A, is stamped out in a predetermined area [cm$^2$] (referred to as "area stamped out"). Then, a mass [mg] (referred to as "mass A") of its stamped-out part is measured. In a similar manner, a part of the positive electrode current collector 21A where neither of the surfaces are provided with any positive electrode mixture layer is stamped out, and a mass [mg] (referred to as "mass B") of its stamped-out part is measured. The area density S is calculated by the following equation.

Area density $S$ [mg/cm$^2$]=(mass $A$−mass $B$)÷area stamped out

[Negative Electrode]

The negative electrode 22 has, for example, a negative electrode current collector 22A having one principal surface and another principal surface, and a double-side deposited portion including a negative electrode active material layer 22B provided on each of both of the surfaces of the negative electrode current collector 22A. Although not shown, the negative electrode 22 may otherwise have a single-side deposited portion including the negative electrode active material layer 22B provided on only one of the surfaces of the negative electrode current collector 22A. The negative electrode current collector 22A may be made of, for example, metallic foil such as copper foil.

The negative electrode active material layer 22B may include, as negative electrode active material, one or more kinds of negative electrode materials capable of intercalating and deintercalating lithium. The negative electrode active material layer 22B may further include other materials such as a binding agent and a conducting agent, which are similar to those included in the positive electrode active material layer 21B, as necessary.

In this battery, for example, an electrochemical equivalent of the negative electrode material capable of intercalating and deintercalating lithium may be larger than the electrochemical equivalent of the positive electrode 21 so that, in theory, unintentional deposition of lithium metal on the negative electrode 22 during charging can be prevented.

Examples of the negative electrode materials capable of intercalating and deintercalating lithium include non-graphitizable carbon, graphitizable carbon, graphite, pyrolytic carbons, cokes, glassy carbons, baked organic polymer compounds, carbon fiber, activated carbon and other carbon materials. Examples of cokes in these materials include pitch coke, needle coke and petroleum coke. The baked organic polymer compounds are materials in which a polymeric material such as phenolic resin and furan resin is baked at appropriate temperatures and carbonized. Some of the baked organic polymer compounds can also be classified as non-graphitizable carbon, or graphitizable carbon. These carbon materials may be desirable because possible changes in crystal structure of such materials in charging and discharging may be very small, and it may make it possible to achieve high charge-discharge capacity and good cycle characteristics. In particular, graphite may be desirable because of its large electrochemical equivalent and capability of providing high energy density. Besides, non-graphitizable carbon may be desirable because of its capability of providing good cycle characteristics. In addition, the carbon materials which show low charge-discharge potential, specifically, those which show charge-discharge potential close to that shown by lithium metal may be desirable; because such materials may make it easier to realize high energy density of the battery.

Further, examples of the negative electrode materials capable of intercalating and deintercalating lithium include a material which is capable of intercalating and deintercalating lithium and contains at least one kind of metal element or metalloid element as a constituent element. This is because high energy density can be achieved when this kind of material is used. In particular, it may be more desirable when such a material is used together with a carbon material, because it may make it possible to achieve high energy density and also good cycle characteristics. This negative electrode material may be in any form of either or both of metal elements and metalloid elements, such as a single substance, an alloy and a compound, and a material that includes one or more of these forms at least in a portion thereof. As used herein, the term "alloy" encompasses alloys containing two or more kinds of metal elements, and also alloys containing one or more kinds of metal elements and one or more kinds of metalloid elements. Further, these alloys may also contain non-metal elements. Examples of structures of these alloys include a solid solution, a eutectic crystal (eutectic mixture), an intermetallic compound, and a state of coexistence of two or more thereof.

Examples of the metal elements and the metalloid elements that can be used to make up such a negative electrode material include the metal elements and metalloid elements that are capable of forming an alloy with lithium. Such a negative electrode material that contains the element capable of forming an alloy with lithium will be referred to as an "alloy-type negative electrode material". Specific examples of the metal elements and the metalloid elements that are capable of forming an alloy with lithium include magnesium (Mg), boron (B), aluminum (Al), titanium (Ti), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd) and platinum (Pt). These materials may be crystalline or amorphous.

Desirably, the negative electrode material may be one which contains a metal element or a metalloid element belonging to group 4B of the short-form periodic table as a constituent element. One which contains at least one of silicon (Si) and tin (Sn) may be more desirable, and one which contains silicon may be especially desirable. This is because silicon (Si) and tin (Sn) have high capability for intercalating and deintercalating lithium; and it may make it possible to achieve high energy density. Examples of the negative electrode materials having at least one of silicon and tin include silicon as single substances, alloys and compounds thereof, tin as single substances, alloys and compounds thereof, and materials that include one or more of these forms at least in a portion thereof.

Examples of alloys of silicon include an alloy containing, as its second constituent element other than silicon (Si), at least one kind of element selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chromium (Cr). Examples of alloys of tin include an alloy containing, as its second constituent element other than tin (Sn), at least one kind of element selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chromium (Cr).

Examples of compounds of tin (Sn) or compounds of silicon (Si) include a compound that contains either or both of oxygen (O) and carbon (C). Such compounds may also contain, in addition to tin (Sn) or silicon (Si), any of the second constituent elements described above.

Among these materials, a SnCoC-containing material that contains cobalt (Co), tin (Sn) and carbon (C) as constituent elements, in which the content of carbon (C) is 9.9% by mass or more and 29.7% by mass or less and the proportion of cobalt (Co) of the sum of tin (Sn) and cobalt (Co) is 30% by mass or more and 70% by mass or less, may be desirable as the negative electrode material. This is because high energy density and good cycle characteristics can be achieved in such a composition range.

The SnCoC-containing material may further contain one or more other constituent elements if necessary. These other constituent elements desirably are, for example, silicon (Si), iron (Fe), nickel (Ni), chromium (Cr), indium (In), niobium (Nb), germanium (Ge), titanium (Ti), molybdenum (Mo), aluminum (Al), phosphorus (P), gallium (Ga), bismuth (Bi), and the like, and two or more thereof may also be contained. By using this material, capacitance characteristics or cycle characteristics can be further improved.

In addition, it is desirable that the SnCoC-containing material have a phase containing tin (Sn), cobalt (Co) and carbon (C), in which the phase has a low crystallized or amorphous structure. Further, in the SnCoC-containing material, it may be desirable that at least a part of carbon as the constituent element be bound to a metal element or a metalloid element as the other constituent element. This is because lowering of cycle characteristics may be due to aggregation or crystallization of tin (Sn) or the like; and therefore, by carbon atoms being bound to other elements, it may make it possible to suppress such aggregation or crystallization.

Examples of measurement methods for examining the binding state of elements include X-ray photoelectron spectroscopy (XPS). In this XPS, so far as graphite is concerned, a peak of the 1s orbit of carbon (C1s) appears at 284.5 eV in an energy-calibrated apparatus such that a peak of the 4f orbit of a gold atom (Au4f) is obtained at 84.0 eV. Also, so far as surface-contaminated carbon is concerned, a peak of the 1s orbit of carbon (C1s) appears at 284.8 eV. On the other hand, when a charge density of the carbon element is high, for example, when carbon is bound to a metal element or a metalloid element, the peak of C1s appears in a lower region than 284.5 eV. That is, when a peak of a combined wave of C1s obtained on the SnCoC-containing material appears in a lower region than 284.5 eV, it means that at least a part of carbon (C) contained in the SnCoC-containing material is bound to a metal element or a metalloid element as other constituent element.

Further, in the XPS measurement, for example, the peak of C1s is used for correcting the energy axis of a spectrum. In most cases, there is some surface-contaminated carbon present in the surface, so the peak of C1s of the surface-contaminated carbon can be fixed at 284.8 eV, and this peak can be used as an energy reference. In the XPS measurement, a waveform of the peak of C1s can be obtained as a form that includes both the peak of the surface-contaminated carbon and the peak of carbon from the SnCoC-containing material, so, for example, through an analysis using commercial software programs, the peak of the surface-contaminated carbon and the peak of the carbon from the SnCoC-containing material can be separated from each other. In the analysis of the waveform, the position of a main peak existing closer to the lowest binding energy is used as an energy reference (284.8 eV).

Also, examples of the negative electrode materials capable of intercalating and deintercalating lithium include metal oxides and polymer compounds, each of which is capable of intercalating and deintercalating lithium. Examples of the metal oxides include, lithium titanium oxide containing lithium and titanium such as lithium titanate ($Li_4Ti_5O_{12}$), iron oxide, ruthenium oxide and molybdenum oxide. Examples of the polymer compounds include polyacetylene, polyaniline and polypyrrole.

The negative electrode material capable of intercalating and deintercalating lithium may be a negative electrode material other than the above. Further, the negative electrode materials mentioned above may also be mixed in any combination of two or more.

The negative electrode active material layer 22B may be, for example, formed by any of a vapor phase method, a liquid phase method, a spraying method, a baking method or a coating method, or a combined method of two or more kinds of these methods. When the negative electrode active material layer 22B is formed by using a vapor phase method, a liquid phase method, a spraying method, a baking method or a combined method of two or more kinds of these methods, it is desirable that the negative electrode active material layer 22B and the negative electrode current collector 22A would be alloyed on at least a part of an interface therebetween. Specifically, it is desirable that on the interface, constituent element of the negative electrode current collector 22A would be diffused into the negative electrode active material layer 22B, the constituent element of the negative electrode active material layer 22B would be diffused into the negative electrode current collector 22A, or these constituent elements would be diffused into each other. This is because the breakage due to expansion and shrinkage, following the charging and discharging, of the negative electrode active material layer 22B can be suppressed, and also that electron conductivity between the negative electrode active material layer 22B and the negative electrode current collector 22A can be improved.

Examples of the vapor phase method include a physical deposition method and a chemical deposition method, specifically a vacuum vapor deposition method, a sputtering method, an ion plating method, a laser abrasion method, a thermal chemical vapor deposition (CVD) method and a plasma chemical vapor deposition method. As the liquid phase method, known techniques such as electrolytic plating and electroless plating can be used. The baking method as referred to herein is, for example, a method in which after a particulate negative electrode active material is mixed with a binding agent and the like, the mixture is dispersed in a solvent and coated, and the coated material is then heated at a higher temperature than a melting point of the binding agent or the like. As the baking method, known techniques can be also utilized, and examples thereof include an atmospheric baking method, a reaction baking method and a hot press baking method.

[Separator]

The separator 23 has a configuration at least including a porous film 23a. A thickness of the separator 23 may be set to any thickness which is more than or equal to the thickness that can maintain a sufficient strength. Desirably, the thickness of the separator 23 may be set in such a way that: the separator 23 can provide insulation between the positive electrode 21 and the negative electrode 22 to prevent a short circuit or the like; have an ion permeability to suitably perform a battery reaction via the separator 23; and allow a volume efficiency of active material layers contributing to the battery reaction in the battery to be as high as possible. Specifically, the separator 23 may have a thickness of, for example, desirably 3 μm or more and 18 μm or less.

Figure 3A:
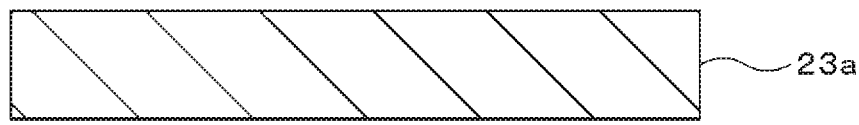
FIG. 3A is a schematic cross-sectional view showing a configuration example of a first separator according to an embodiment of the present disclosure.
Figure 3B:
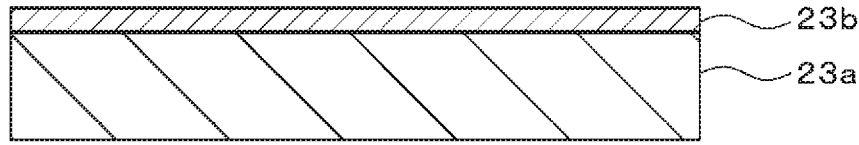
FIG. 3B is a schematic cross-sectional view showing a configuration example of a second separator according to an embodiment of the present disclosure.

Examples of this separator 23 include the following first separator and second separator. FIG. 3A shows a configuration example of a first separator. FIG. 3B shows a configuration example of a second separator.

[First Separator]

As shown in FIG. 3A, the first separator is made solely of the porous film 23a.

[Porous Film]

The porous film 23a has a structure that satisfies the following formulae:

$$t = a \times \mathrm{Ln}(\epsilon) - 4.02a + 100$$

and $$-1.87 \times 10^{10} \times S^{-4.96} \leq a \leq -40$$

where $\epsilon$ is the porosity [%], t is the air permeability [sec/100 cc], S is the area density of the positive electrode active material layer [mg/cm$^2$] and Ln is natural logarithm.

In addition, as described above, the area density S [mg/cm$^2$] of the positive electrode active material layer 21B is more than or equal to 30 mg/cm$^2$. Furthermore, taking into account ranges of possible values for satisfying the formulae, the area density S [mg/cm$^2$] of the positive electrode active material layer 21B may desirably be less than or equal to 50 mg/cm$^2$.

Examples of resin materials of the porous film 23a include polyolefin resins such as polypropylene and polyethylene; acrylic resin; styrene resin; polyester resin; nylon resin, and the like. Among these resin materials, it may be desirable to use the polyolefin resin (polyolefin film) which may easily form the structure satisfying the above formulae, have a good effect of preventing short-circuiting, and have a shutdown effect which improves safety of the battery. In addition, the porous film 23a may have a structure in which two or more resin layers each of which is made of the resin material. The porous film 23a may be a resin film formed by melt-compounding two or more kinds of the resin materials. The porous film 23a may also contain an additive such as antioxidants.

[Method of Preparing Porous Film]

The porous film 23a may be, for example, prepared in the following manner. For example, a substantially homogeneous solution, which is prepared by mixing a polymer such as a polyolefin resin with a solvent (plasticizer) at high temperature, may be formed into a film by a T die method, an inflation method, or the like. After that, the formed film is stretched, and then, by extracting the solvent into a different solvent which is volatile, the solvent is removed and thus the porous film 23a is formed. As the solvent, one or more non-volatile organic solvents capable of dissolving the polymer at high temperature may be used singly or in admixtures. The form of phase separation may be different depending on the combination of a polymer and a solvent, and the porous structure may vary as well. Examples of methods for stretching that can be employed include a successive biaxial stretching method by roller stretching and tenter stretching; a simultaneous biaxial stretching method by a simultaneous biaxial tenter, and the like. In the process of production, by controlling at least one condition of: an amount of plasticizer, a draw ratio and an elongation temperature, it is possible to obtain the porous film 23a having desired porosity and desired air permeability. It should be noted that the method of preparing the porous film 23a is not limited to the above example.

[Porosity]

The porosity $\epsilon$ [%] of the porous film 23a may desirably be, for example, from the viewpoint of ensuring good ion conductivity, more than or equal to 20%; and from the viewpoint of maintaining physical strength and preventing short-circuiting, less than or equal to 57%.

[Method for Measuring Porosity]

The porosity $\epsilon$ [%] of the porous film 23a may be measured by using a gravimetric method. According to this method, ten areas of the porous film 23a are each stamped out in a thickness direction of the porous film 23a, into a round shape of 2 cm in diameter; and, a thickness h of the center part of the stamped-out round film and a mass w of the film are measured. Then, by using these thickness h and mass w, a volume V of ten pieces of film and a mass W of ten pieces of film is determined. The porosity $\epsilon$ [%] is calculated by the following equation.

$$\mathrm{Porosity}\ \epsilon[\%] = \{(\rho V - W)/(\rho V)\} \times 100$$

Here, $\rho$ is a density of a material of the porous film 23a.

[Air Permeability]

The air permeability t [sec/100 cc] of the porous film 23a may desirably be, for example, from the viewpoint of maintaining physical strength and preventing short-circuiting, more than or equal to 100 sec/100 cc; and from the viewpoint of ensuring good ion conductivity, less than or equal to 1000 sec/100 cc.

[Method for Measuring Air Permeability]

The air permeability t [sec/100 cc] is Gurley permeability. Gurley permeability can be measured according to JIS P 8117. Gurley permeability shows the time in seconds for 100 cc of air to pass through a film under the pressure of 1.22 kPa.

[Second Separator]

As shown in FIG. 3B, the second separator includes the porous film 23a and a surface layer 23b being provided on at least one surface of the porous film 23a. FIG. 3B shows an example in which the surface layer 23b is provided on one of the surfaces of the porous film 23a. Although not shown in the drawings, the surface layer 23b may also be provided on both of the surfaces of the porous film 23a.

[Porous Film 23a]

The porous film 23a may have a configuration similar to that described above.

[Surface Layer]

The surface layer 23b may contain a resin material, inorganic particles and organic particles.

[Resin Material]

The resin material is contained in the surface layer 23b, for binding the particles to the surface of the porous film 23a and for mutually binding the particles together. This resin material may be, for example, fibrillated and formed in a three-dimensional network structure with fibrils continuously interconnected. The particles may be kept in a dispersed state without being fixed together, by being held by the resin material having such a three-dimensional network structure. Alternatively, the resin material may also bind to the surface of the porous film 23a and mutually bind the particles together without being fibrillated. In this case, better binding property may be obtained.

Examples of the resin materials that can be contained in the surface layer 23b include: a fluorine-containing resin such as polyvinylidene fluoride and polytetrafluoroethylene; a fluorine-containing rubber such as vinylidene fluoride-tetrafluoroethylene copolymer and ethylene-tetrafluoroethylene copolymer; styrene-butadiene copolymer and hydrides thereof; acrylonitrile-butadiene copolymer and hydrides thereof; acrylonitrile-butadiene-styrene copolymer and hydrides thereof; methacrylic ester-acrylic ester copolymer; styrene-acrylic ester copolymer; acrylonitrile-acrylic ester copolymer; ethylene-propylene rubber; polyvinyl acetate and the like; cellulose derivatives such as ethyl cellulose, methyl cellulose, hydroxyethyl cellulose and carboxymethyl cellulose; polyphenylene ether; polysulfone; polyether sulfone; polyphenylene sulfide; polyetherimide; polyimide; polyamide (especially aramid); polyamideimide; polyacrylonitrile; polyvinyl alcohol; polyether; an acrylate resin, polyester and other resins having at least one temperature of a melting point and a glass-transition temperature being higher than or equal to 180° C.; a phenolic resin, an epoxy resin and other thermosetting resins.

[Inorganic Particles]

Examples of the inorganic particles that can be contained in the surface layer 23b include electrically insulating inorganic particles such as metal oxides, metal oxide hydrates, metal hydroxides, metal nitrides, metal carbides and metal sulfides. Examples of metal oxides or metal oxide hydrates that can be suitably used include aluminum oxide (alumina, $Al_2O_3$), boehmite ($Al_2O_3H_2O$ or AlOOH), magnesium oxide (magnesia, MgO), titanium oxide (titania, $TiO_2$), zirconium oxide (zirconia, $ZrO_2$), silicon oxide (silica, $SiO_2$), yttrium oxide (yttria, $Y_2O_3$), zinc oxide (ZnO) and the like. Examples of metal nitrides that can be suitably used include silicon nitride ($Si_3Ni_4$), aluminum nitride (AlN), boron nitride (BN), titanium nitride (TiN) and the like. Examples of metal carbides that can be suitably used include silicon carbide (SiC), boron carbide ($B_4C$), and the like. Examples of metal sulfides that can be suitably used include barium sulfate ($BaSO_4$) and the like. Examples of metal hydroxides that can be used include aluminum hydroxide ($Al(OH)_3$) and the like. Further, a porous aluminosilicate such as zeolite ($M_{2/n}O.Al_2O_3.xSiO_2.yH_2O$; where M is a metal element, $x \geq 2$, $y \geq 0$); a layer silicate such as talc ($Mg_3Si_4O_{10}(OH)_2$); or a mineral such as barium titanate ($BaTiO_3$) and strontium titanate ($SrTiO_3$) may also be used. Still further, a lithium compound such as Li2O4, Li3Po4 and LiF may also be used. A carbon material such as graphite, carbon nanotube and diamond may also be used. Among these materials, it may be desirable to use alumina, boehmite, talc, titania (especially one having rutile structure), silica or magnesia. It may be more desirable to use alumina or boehmite.

These inorganic particles may be used singly or in mixtures of two or more thereof. The shape of the inorganic particles is not limited in particular, and those having any of a spherical shape, a fiber shape, an acicular shape, a scale-like shape, a plate shape, random shapes, and the like, may be employed.

[Organic Particles]

Examples of materials of the organic particles include: a fluorine-containing resin such as polyvinylidene fluoride and polytetrafluoroethylene; a fluorine-containing rubber such as vinylidene fluoride-tetrafluoroethylene copolymer and ethylene-tetrafluoroethylene copolymer; styrene-butadiene copolymer and hydrides thereof; acrylonitrile-butadiene copolymer and hydrides thereof; acrylonitrile-butadiene-styrene copolymer and hydrides thereof; methacrylic ester-acrylic ester copolymer; styrene-acrylic ester copolymer; acrylonitrile-acrylic ester copolymer; ethylene-propylene rubber; polyvinyl acetate and the like; cellulose derivatives such as ethyl cellulose, methyl cellulose, hydroxyethyl cellulose and carboxymethyl cellulose; polyphenylene ether; polysulfone; polyether sulfone; polyphenylene sulfide; polyetherimide; polyimide; polyamide such as wholly aromatic polyamide (aramid); polyamideimide; polyacrylonitrile; polyvinyl alcohol; polyether; an acrylate resin, polyester and other resins having high heat resistance that at least one temperature of a melting point and a glass-transition temperature being higher than or equal to 180° C.; a phenolic resin, an epoxy resin and other thermosetting resins. These materials may be used singly or in mixtures of two or more thereof. The shape of the organic particles is not limited in particular, and those having any of a spherical shape, a fiber shape, an acicular shape, a scale-like shape, a plate shape, random shapes, and the like, may be employed.

The surface layer 23b may be obtained by, for example, mixing the resin material and the particles together; adding the resulting mixture to a dispersing solvent such as N-methyl-2-pyrrolidone to dissolve the resin material and obtain a resin solution; and coating this resin solution on at least one surface of the porous film 23a, followed by drying it, and the like.

[Non-Aqueous Electrolyte Solution]

A non-aqueous electrolyte solution may contain an electrolytic salt and a non-aqueous solvent.

The electrolytic salt may contain, for example, one or more kinds of light metal salts such as lithium salts. Examples of the lithium salts include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithiumhexafluorosilicate ($Li_2SiF_6$), lithium chloride (LiCl), lithium bromide (LiBr) and the like. Among these light metal salts, it may be desirable to use at least one kind thereof selected from the group consisting of lithium hexafluorophosphate, lithium tetrafluoroborate, lithium perchlorate, and lithium hexafluoroarsenate. It may be more desirable to use lithium hexafluorophosphate.

Examples of the non-aqueous solvents include lactone-based solvents such as γ-butyrolactone, γ-valerolactone, δ-valerolactone and ε-caprolactone; carbonate-based solvents such as ethylene carbonate, propylene carbonate, butylene carbonate, vinylene carbonate, dimethyl carbonate, ethyl methyl carbonate and diethyl carbonate; ether solvents such as 1,2-dimethoxyethane, 1-ethoxy-2-methoxyethane, 1,2-diethoxyethane, tetrahydrofuran and 2-methyltetrahydrofuran; nitrile solvents such as acetonitrile; sulfolane solvents; phosphoric acids; phosphate ester solvents; pyrrolidones and other non-aqueous solvents. Any one kind of the non-aqueous solvents may be used singly, or may be used in admixtures of two or more thereof.

Further, as the non-aqueous solvent, it may be desirable to use a mixture of a cyclic carbonate ester and a chain carbonate ester. It may be more desirable to use one including at least a compound in which a part or all of replaceable hydrogen atoms of the cyclic carbonate ester or the chain carbonate ester are fluorinated. Examples of the fluorinated compounds that can be desirably used include fluoroethylene carbonate (4-fluoro-1,3-dioxolan-2-one: FEC) and difluoroethylene carbonate (4,5-difluoro-1,3-dioxolan-2-one: DFEC). This is because they can provide improved charge-discharge cycle characteristics even in cases where the negative electrode 22 includes a compound that contains silicon (Si), tin (Sn), germanium (Ge), or the like, as the negative electrode active material. Further, among the above, it may be more desirable to use difluoroethylene carbonate as the non-aqueous solvent. This is because of its good effectiveness in the improvement of cycle characteristics.

[Method of Producing Battery]
[Method of Producing Positive Electrode]

A positive electrode mixture is prepared by mixing the positive electrode material, the conducting agent and the binding agent. This positive electrode mixture is dispersed in a solvent such as N-methyl-2-pyrrolidone, to prepare a positive electrode mixture slurry in a paste form. Then, the positive electrode mixture slurry is coated on the positive electrode current collector 21A, the solvent is dried, and the resulting material is formed into the positive electrode active material layer 21B by compression-molding using a roll press or the like. Thus, the positive electrode 21 is prepared.

[Method of Producing Negative Electrode]

A negative electrode mixture is prepared by mixing the negative electrode material and the binding agent. This negative electrode mixture is dispersed in a solvent such as N-methyl-2-pyrrolidone, to prepare a negative electrode mixture slurry in a paste form. Then, the negative electrode mixture slurry is coated on the negative electrode current collector 22A, the solvent is dried, and the resulting material is formed into the negative electrode active material layer 22B by compression-molding using the roll press or the like. Thus, the negative electrode 22 is prepared.

[Preparation of Non-Aqueous Electrolyte Solution]

The non-aqueous electrolyte solution is prepared by dissolving the electrolytic salt in the non-aqueous solvent.

[Assembly of Battery]

The positive electrode lead 25 is installed in the positive electrode current collector 21A by welding or the like, and the negative electrode lead 26 is installed in the negative electrode current collector 22A by welding or the like. Then, the positive electrode 21 and the negative electrode 22 are spirally wound with the separator 23 of the embodiment of the present disclosure interposing therebetween, to form the spirally wound electrode body 20.

Subsequently, an end of the positive electrode lead 25 is welded to the safety valve mechanism, and an end of the negative electrode lead 26 is welded to the can bottom of the battery can 11. After that, the spirally wound electrode body 20 is sandwiched from its winding peripheral surfaces by the pair of insulating plates 12a and 12b, and these parts are housed together inside the battery can 11. After housing the spirally wound electrode body 20 inside the battery can 11, the non-aqueous electrolyte solution is injected into the battery can 11, and the separator 23 is impregnated with the non-aqueous electrolyte solution. Then, the battery lid 13, the safety valve mechanism including the safety valve 14, and the PTC device 17, are fixed at the open end of the battery can 11 by being caulked with the gasket 18. The battery of the embodiment of the present disclosure shown in FIG. 1 can thus be formed.

Regarding this battery, when charged, for example, lithium ions may be extracted from the positive electrode active material layer 21B, and intercalated into the negative electrode active material layer 22B via the non-aqueous electrolyte solution impregnated in the separator 23. When discharged, for example, lithium ions may be extracted from the negative electrode active material layer 22B, and intercalated into the positive electrode active material layer 21B via the non-aqueous electrolyte solution impregnated in the separator 23.

2. Second Embodiment

[Example of Battery Pack]

Figure 4:
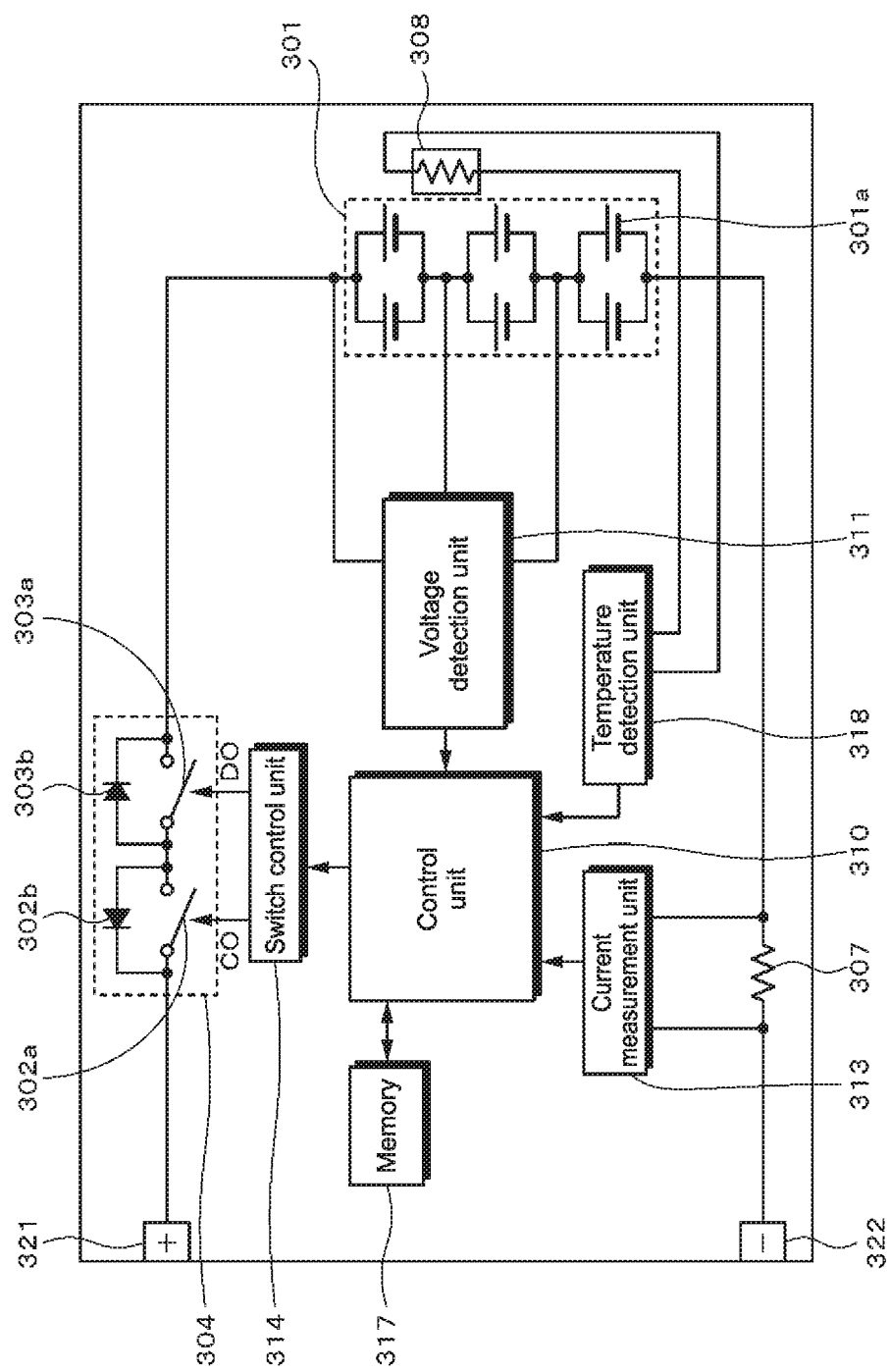
FIG. 4 is a block diagram showing a configuration example of a battery pack according to a second embodiment of the present disclosure.

FIG. 4 is a block diagram showing a circuit configuration example of a case where the battery of the first embodiment of the present disclosure (hereinafter also referred to as "secondary battery", as appropriate) is applied to a battery pack. The battery pack includes an assembled battery 301, an exterior, a switch unit 304 having a charge control switch 302a and a discharge control switch 303a, a current sensing resistor 307, a temperature sensing device 308, and a control unit 310.

Further, the battery pack includes a positive terminal 321 and a negative terminal 322. In charging, the positive terminal 321 and the negative terminal 322 are connected to a positive terminal and a negative terminal of a charger, respectively, and the charging is carried out. On the other hand, when using an electronic apparatus, the positive terminal 321 and the negative terminal 322 are connected to a positive terminal and a negative terminal of the apparatus, respectively, and the discharge is carried out.

The assembled battery 301 is configured with a plurality of the secondary batteries 301a connected to one another in series and/or in parallel. The secondary battery 301a is a secondary battery of an embodiment of the present disclosure. It should be noted that although there is shown in FIG. 4 a case where the six secondary batteries 301a are connected in two batteries in parallel and three in series (2P3S configuration) as an example, also others, such as n in parallel and m in series (where n and m are integers), and any way of connections may be adopted.

The switch unit 304 includes a charge control switch 302a and a diode 302b, and a discharge control switch 303a and a diode 303b and is controlled by a control unit 310. The diode 302b has the polarity in opposite direction with respect to charge current flowing from the positive terminal 321 to the assembled battery 301 and in forward direction with respect to discharge current flowing from the negative terminal 322 to the assembled battery 301. The diode 303b has the polarity in forward direction with respect to the charge current and in opposite direction with respect to the discharge current. It should be noted that although in this example the switch unit 304 is provided on the positive terminal side, it may otherwise be provided on the negative terminal side.

The charge control switch 302a is configured to be turned off in the case where a battery voltage reaches an overcharge detection voltage, and it is controlled by the control unit 310 such that the charge current does not flow in a current path of the assembled battery 301. After the charge control switch 302a is turned off, only discharge can be performed via the diode 302b. Further, in the case where a large amount of current flows at a time of charge, the charge control switch 302a is turned off and is controlled by the control unit 310 such that the charge current flowing in the current path of the assembled battery 301 is shut off.

The discharge control switch 303a is configured to be turned off in the case where a battery voltage reaches an overdischarge detection voltage, and it is controlled by the control unit 310 such that the discharge current does not flow in a current path of the assembled battery 301. After the discharge control switch 303a is turned off, only charge can be performed via the diode 303b. Further, in the case where a large amount of current flows at a time of discharge, the discharge control switch 303a is turned off and is controlled by the control unit 310 such that the discharge current flowing in the current path of the assembled battery 301 is shut off.

A temperature sensing device 308 is a thermistor, for example, provided in the vicinity of the assembled battery 301. The temperature sensing device 308 is configured to measure a temperature of the assembled battery 301 and supply the measured temperature to the control unit 310. A voltage detection unit 311 is configured to measure voltages of the assembled battery 301 and each of the secondary batteries 301a included in the assembled battery 301, then A/D-convert the measured voltages, and supply them to the control unit 310. A current measurement unit 313 is configured to measure a current using a current detection resistor 307 and supply the measured current to the control unit 310.

The switch control unit 314 is configured to control the charge control switch 302a and the discharge control switch 303a of the switch unit 304 on the basis of the voltage and the current that are input from the voltage detection unit 311 and the current measurement unit 313. The switch control unit 314 is configured to transmit a control signal of the switch unit 304 when a voltage of any one of secondary batteries 301a reaches the overcharge detection voltage or less or the overdischarge detection voltage or less, or, a large amount of current flows rapidly, in order to prevent overcharge, overdischarge, and over-current charge and discharge. Here, in the case where the secondary battery is a lithium-ion secondary battery, an overcharge detection voltage is defined to be 4.20 V±0.05 V, for example, and an overdischarge detection voltage is defined to be 2.4 V±0.1 V, for example.

For a charge and discharge control switch, a semiconductor switch such as a MOSFET (metal-oxide semiconductor field-effect transistor) can be used. In this case, parasitic diodes of the MOSFET function as the diodes 302b and 303b. In the case where p-channel FETs (field-effect transistors) are used as the charge and discharge control switch, the switch control unit 314 supplies a control signal DO and a control signal CO to a gate of the charge control switch 302a and that of the discharge control switch 303a, respectively. In the case where the charge control switch 302a and the discharge control switch 303a are of p-channel type, the charge control switch 302a and the discharge control switch 303a are turned on by a gate potential lower than a source potential by a predetermined value or more. In other words, in normal charge and discharge operations, the control signals CO and DO are determined to be a low level and the charge control switch 302a and the discharge control switch 303a are turned on.

Further, for example, when overcharged or overdischarged, the control signals CO and DO are determined to be a high level and the charge control switch 302a and the discharge control switch 303a are turned off.

A memory 317 includes a RAM (random access memory), a ROM (read only memory), an EPROM (erasable programmable read only memory) serving as a nonvolatile memory, or the like. In the memory 317, numerical values computed by the control unit 310, an internal resistance value of a battery in an initial state of each secondary battery 301a, which has been measured in a stage of a manufacturing process, and the like are stored in advance, and can be rewritten as appropriate. Further, when a full charge capacity of the secondary battery 301a is stored, for example, a remaining capacity can be calculated together with the control unit 310.

A temperature detection unit 318 is provided, to measure the temperature using the temperature sensing device 308 and control charging or discharging when abnormal heat generation has occurred, or perform correction in calculation of the remaining capacity.

3. Third Embodiment

The above-mentioned battery according to the first embodiment of the present disclosure and the battery pack according to the second embodiment using this battery can be installed or be used in providing electricity to apparatus such as electronic apparatus, electric vehicle and electrical storage apparatus, for example.

Examples of electronic apparatus are laptops, PDA (Personal Digital Assistant), cellular phones, cordless telephone handset, video movies, digital still cameras, electronic books, electronic dictionaries, music players, radio, headphones, game machine, navigation system, memory cards, pacemakers, hearing aids, electric tools, electric shavers, refrigerator, air-conditioner, televisions, stereos, water heater, microwave oven, dishwasher, washing machine, dryer, lighting equipment, toys, medical equipment, robots, load conditioners, traffic lights, and the like.

Examples of electric vehicles are railway vehicles, golf carts, electric carts, electric motorcars (including hybrid motorcars), and the like. The above-mentioned embodiments would be used as their driving power source or auxiliary power source.

Examples of electrical storage apparatus include power sources for electrical storage to be used by power generation facilities or buildings such as houses.

Among examples of application mentioned in the above, a specific example of power storage system which has adopted a battery of the embodiments of the present disclosure will be described below.

The power storage system may employ the following configurations, for example. A first power storage system is a power storage system having an electrical storage apparatus configured to be charged by a power generating device that generates electricity from renewable energy. A second power storage system has an electrical storage apparatus, and is configured to provide electricity to an electronic apparatus connected to the electrical storage apparatus. A third power storage system is a configuration of an electronic apparatus in such a way as to receive electricity supply from an electrical storage apparatus. These power storage systems are realized as a system in order to supply electricity efficiently in cooperation with an external power supply network.

Furthermore, a fourth power storage system is a configuration of an electric vehicle, including a converter configured to receive electricity supply from an electrical storage apparatus and convert the electricity into driving force for vehicle, and further including a controller configured to process information on vehicle control on the basis of information on the electrical storage apparatus. A fifth power storage system is an electricity system including an electricity information transmitting-receiving unit configured to transmit and receive signals via a network to and from other apparatuses, in order to control the charge and discharge of the above-mentioned electrical storage apparatus on the basis of information received by the transmitting-receiving unit. The sixth power storage system is an electricity system configured to receive electricity supply from the above-mentioned electrical storage apparatus or provide the electrical storage apparatus with electricity from at least one of a power generating device and a power network. The power storage system is described below.

3-1.) Power Storage System for Houses as Application Example

Figure 5:
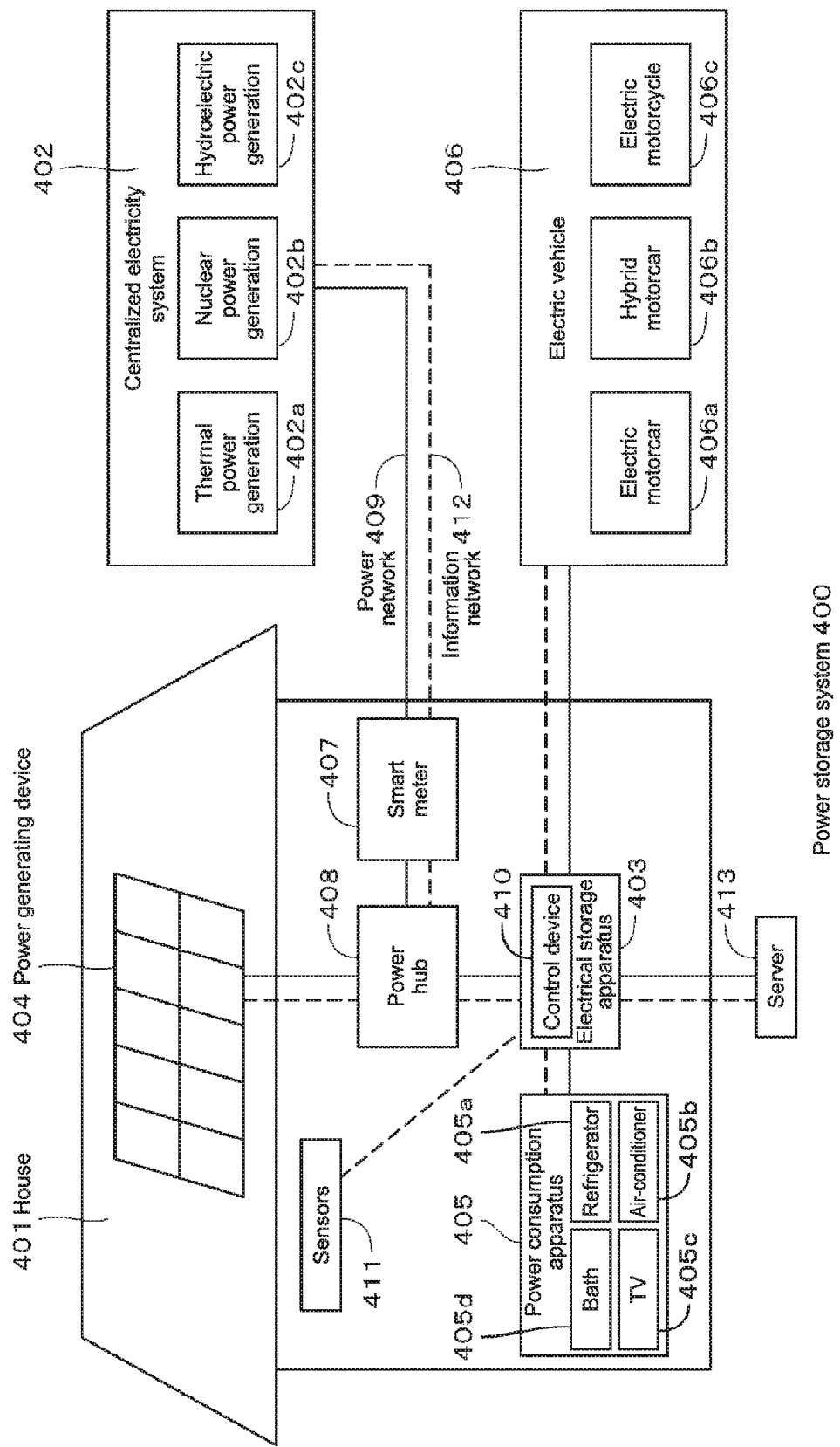
FIG. 5 is a schematic diagram showing an application example of power storage system for houses, using a battery according to an embodiment of the present disclosure.

An example of a case where electrical storage apparatus using the battery of an embodiment of the present disclosure is applied to power storage system for houses will be described with reference to FIG. 5. For example, in power storage system 400 for a house 401, electricity is provided to an electrical storage apparatus 403 from a centralized electricity system 402 including thermal power generation 402*a*, nuclear power generation 402*b*, hydroelectric power generation 402*c* and the like via power network 409, information network 412, smart meter 407, power hub 408 and the like. Along with this, from independent power source such as in-house power generating device 404, electricity is also provided to the electrical storage apparatus 403. Therefore, electricity given to the electrical storage apparatus 403 is stored. By using the electrical storage apparatus 403, electricity to be used in the house 401 can be supplied. Not only for a house 401, but also with respect to other buildings, similar power storage system can be applied.

The house 401 is provided with the power generating device 404, a power consumption apparatus 405, an electrical storage apparatus 403, a control device 410 that controls each device or apparatus, a smart meter 407, and sensors 411 that obtain various kinds of information. The devices or apparatus are connected to one another through the power network 409 and the information network 412. For the power generating device 404, a solar battery, a fuel battery, or the like is used, and the generated electricity is supplied to the power consumption apparatus 405 and/or the electrical storage apparatus 403. Examples of the power consumption apparatus 405 include a refrigerator 405*a*, an air-conditioner 405*b*, a television receiver 405*c*, and a bath 405*d*. In addition, the power consumption apparatus 405 includes an electric vehicle 406. Examples of the electric vehicle 406 include an electric motorcar 406*a*, a hybrid motorcar 406*b*, and an electric motorcycle 406*c*.

The above-mentioned battery of an embodiment of the present disclosure is applied to the electrical storage apparatus 403. The battery of an embodiment of the present disclosure may be, for example, configured by a lithium-ion secondary battery. The smart meter 407 has functions of measuring the used amount of commercial electricity and transmitting the measured used amount to an electricity company. The power network 409 may be any one of DC power feeding, AC power feeding, and noncontact supply of electricity, or may be such that two or more of them are combined.

Examples of various sensors 411 include a human detection sensor, an illumination sensor, an object detection sensor, a power consumption sensor, a vibration sensor, a contact sensor, a temperature sensor and an infrared sensor. The information obtained by the various sensors 411 is transmitted to the control device 410. The state of the weather conditions, the state of a person, and the like are understood on the basis of the information from the sensors 411, and the power consumption apparatus 405 can be automatically controlled to minimize energy consumption. In addition, it is possible for the control device 410 to transmit information on the house 401 to an external electricity company and the like through the Internet.

Processing, such as branching of electricity lines and DC/AC conversion, is performed by using a power hub 408. Examples of a communication scheme for an information network 412 that is connected with the control device 410 include a method of using a communication interface, such as UART (Universal Asynchronous Receiver-Transceiver: transmission and reception circuit for asynchronous serial communication), and a method of using a sensor network based on a wireless communication standard, such as Bluetooth, ZigBee, and WiFi. The Bluetooth method can be applied to multimedia communication, so that one-to-many connection communication can be performed. ZigBee uses the physical layer of IEEE (Institute of Electrical and Electronics Engineers) 802.15.4. IEEE 802.15.4 is the title of the short-distance wireless network standard called personal area network (PAN) or wireless (W) PAN.

The control device 410 is connected to an external server 413. The server 413 may be managed by one of the house 401, an electricity company, and a service provider. The information that is transmitted and received by the server 413 is, for example, information on power consumption information, life pattern information, an electricity fee, weather information, natural disaster information, and electricity transaction. These pieces of information may be transmitted and received from a power consumption apparatus (for example, television receiver) inside a household. Alternatively, the pieces of information may be transmitted and received from an out-of-home device (for example, a mobile phone, etc.). These pieces of information may be displayed on a device having a display function, for example, a television receiver, a mobile phone, or a personal digital assistant (PDA).

The control device 410 that controls each unit includes central processing unit (CPU), a random access memory (RAM), a read only memory (ROM), and the like. In this example, the control device 410 is stored in the electrical storage apparatus 403. The control device 410 is connected to the electrical storage apparatus 403, the in-house power generating device 404, the power consumption apparatus 405, the various sensors 411, and the server 413 through the information network 412, and has functions of adjusting the use amount of the commercial electricity, and the amount of power generation. In addition, the control device 410 may have a function of performing electricity transaction in the electricity market.

As described above, not only the centralized electricity system 402 in which electricity comes from thermal power generation 402a, nuclear power generation 402b, hydroelectric power generation 402c, or the like, but also the generated electricity from the in-house power generating device 404 (solar power generation, wind power generation) can be stored in the electrical storage apparatus 403. Therefore, even if the generated electricity of the in-house power generating device 404 varies, it is possible to perform control such that the amount of electricity to be sent to the outside is made constant or electric discharge is performed by only a necessary amount. For example, usage is possible in which electricity obtained by the solar power generation is stored in the electrical storage apparatus 403, late night power whose fee is low during nighttime is stored in the electrical storage apparatus 403, and the electricity stored by the electrical storage apparatus 403 is discharged and used in a time zone in which the fee during daytime is high.

In this example, an example has been described in which the control device 410 is stored in the electrical storage apparatus 403. Alternatively, the control device 410 may be stored in the smart meter 407 or may be configured singly. In addition, the power storage system 400 may be used by targeting a plurality of households in a block of apartments or may be used by targeting a plurality of single-family detached houses.

3-2.) Power Storage System for Vehicles as Application Example

Figure 6:
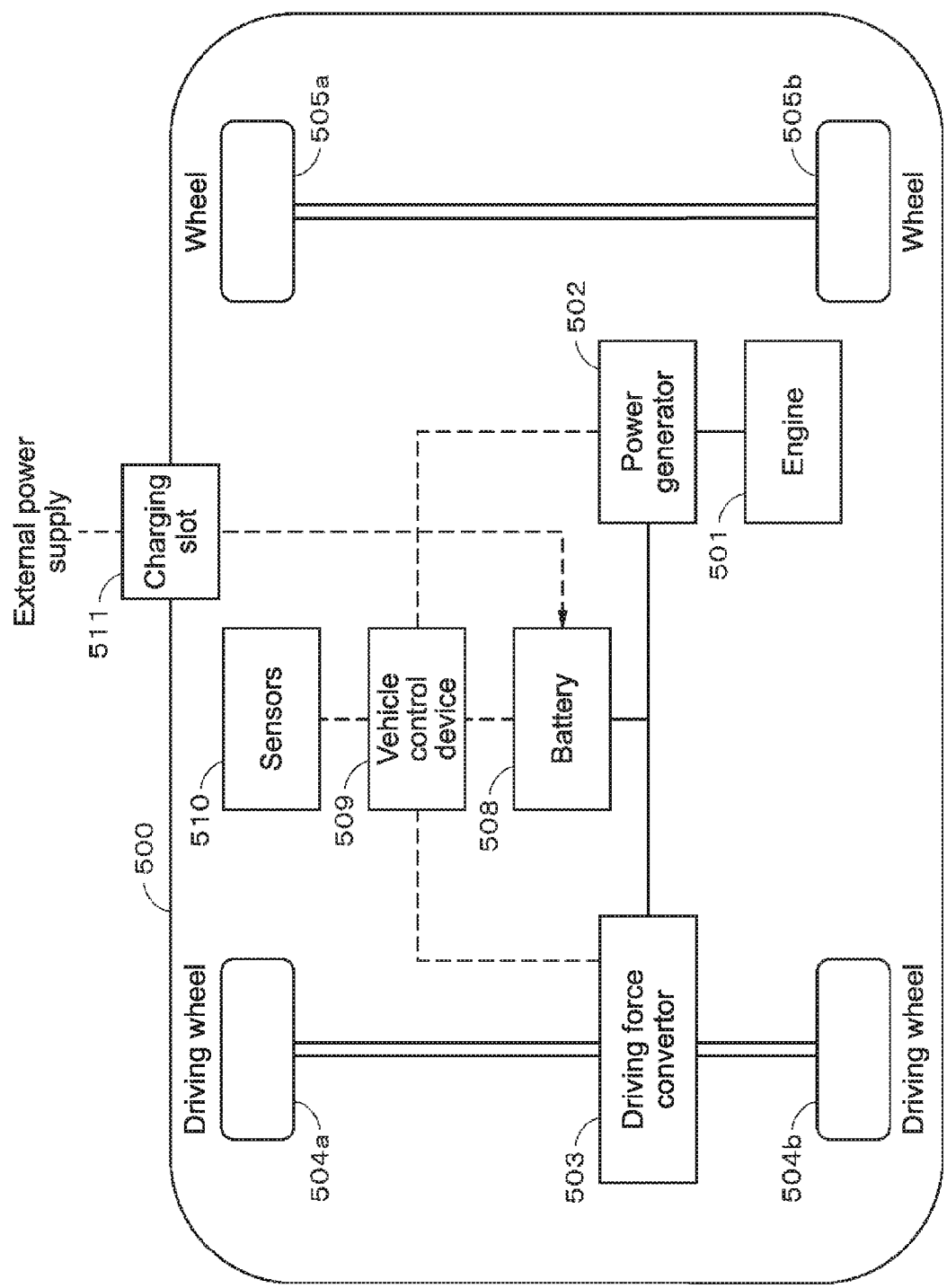
FIG. 6 is a diagram showing schematically an example of configuration of a hybrid vehicle employing series-hybrid system in which an embodiment of the present disclosure is applied.

An example of a case where an embodiment of the present disclosure is applied to a power storage system for vehicles will be described with reference to FIG. 6. FIG. 6 schematically shows an example of configuration of a hybrid vehicle employing series-hybrid system, in which an embodiment of the present disclosure is applied. A series-hybrid system is a car that runs using electricity driving force converter by using electricity generated by a power generator that is driven by an engine or by using electricity that is temporarily stored in a battery.

A hybrid vehicle 500 is equipped with an engine 501, a power generator 502, an electricity driving force converter 503, a driving wheel 504a, a driving wheel 504b, a wheel 505a, a wheel 505b, a battery 508, a vehicle control device 509, various sensors 510, and a charging slot 511. The above-mentioned battery of an embodiment of the present disclosure is applied to the battery 508.

The hybrid vehicle 500 runs by using the electricity driving force converter 503 as a power source. An example of the electricity driving force converter 503 is a motor. The electricity driving force converter 503 operates using the electricity of the battery 508, and the rotational force of the electricity driving force converter 503 is transferred to the driving wheels 504a and 504b. By using direct current-alternating current (DC-AC) or inverse conversion (AC-DC conversion) at a necessary place, the electricity driving force converter 503 can use any of an AC motor and a DC motor. The various sensors 510 are configured to control the engine revolution speed through the vehicle control device 509 or control the opening (throttle opening) of a throttle valve, although not shown in the drawing. The various sensors 510 include a speed sensor, an acceleration sensor, an engine revolution speed sensor, and the like.

The rotational force of the engine 501 is transferred to the power generator 502, and the electricity generated by the power generator 502 by using the rotational force can be stored in the battery 508.

When a hybrid vehicle 500 decelerates by a braking mechanism, although not shown in the drawing, the resistance force at the time of the deceleration is added as a rotational force to the electricity driving force converter 503. The regenerative electricity generated by the electricity driving force converter 503 by using the rotational force can be stored in the battery 508.

The battery 508, as a result of being connected to an external power supply of the hybrid vehicle 500, receives supply of electricity by using a charging slot 511 as an input slot from the external power supply, and can store the received electricity.

Although not shown in the drawing, the embodiment of the present disclosure may include an information processing device that performs information processing for vehicle control on the basis of information on a secondary battery. Examples of such information processing devices include an information processing device that performs display of the remaining amount of a battery on the basis of the information on the remaining amount of the battery.

In the foregoing, a description has been made referring to an example of a series-hybrid car that runs using a motor by using electricity generated by a power generator that is driven by an engine or by using electricity that had once been stored in a battery. However, the embodiment according to the present disclosure can be effectively applied to a parallel hybrid car in which the outputs of both the engine and the motor are used as a driving source and in which switching between three methods, that is, running using only an engine, running using only a motor, and running using an engine and a motor, is performed as appropriate. In addition, the embodiment according to the present disclosure can be effectively applied to a so-called motor-driven vehicle that runs by driving using only a driving motor without using an engine.

EXAMPLES

The present disclosure will now be described in more detail by way of examples thereof. It should be noted, however, that the present disclosure is not limited to these Examples.

Example 1

Preparation of Positive Electrode

By mixing 5 grams of polyvinylidene fluoride as a binder (binding agent), 10 grams of carbon black as the conducting agent and 85 grams of $LiNi_{0.80}Co_{0.15}Al_{0.05}O_2$ as the positive electrode active material, and adding N-methyl-2-pyrrolidone (hereinafter referred to as "NMP") to the resulting mixture, a positive electrode mixture slurry in a paste form was prepared. Incidentally, an amount of the added NMP was adjusted as appropriate, to form a paste that can be coated on an aluminum foil as a current collector.

The positive electrode mixture slurry was coated on the aluminum foil as the current collector (on the both sides), which aluminum foil had a thickness of 30 μm. Subsequently, NMP was dried and removed from the slurry by heating with hot air, and then pressing was performed. The thickness and density were adjusted, and thus, the positive electrode having the positive electrode active material layers formed on the both sides of the positive electrode current collector was obtained. Incidentally, in this process of pressing, the area density may be adjusted by compression-molding using the roll press, or the like, while heating as necessary, and by thus adjusting the thickness and density. In this case, the compression-molding can be performed several times. In Example 1, the area density of the positive electrode active material layer was adjusted to 31 mg/cm$^2$.

[Preparation of Negative Electrode]

By mixing 3 grams of polyvinylidene fluoride as a binder (binding agent) and 95 grams of natural graphite as the negative electrode active material, and adding N-methyl-2-pyrrolidone (hereinafter referred to as "NMP") to the resulting mixture, a negative electrode mixture slurry in a paste form was prepared. Incidentally, an amount of the added NMP was adjusted as appropriate, to form a paste that can be coated on a copper foil as a negative electrode current collector.

The negative electrode mixture slurry was coated on the copper foil as the negative electrode current collector (on the both sides), which copper foil had a thickness of 20 μm. Subsequently, NMP was dried and removed from the slurry by heating with hot air, and then pressing was performed. The thickness and density were adjusted, and thus, the negative electrode was obtained.

[Preparation of Separator]

The following polyethylene film was prepared as the separator. A raw material resin, in which 2 parts by mass of an ultra-high molecular weight polyethylene having a weight-average molecular weight (Mw) of 2.5×10$^6$ and 13 parts by mass of a polyethylene having a weight-average molecular weight (Mw) of 2.4×10$^5$ were mixed together, was further mixed with a liquid paraffin in a quantity corresponding to desired porosity and air permeability (porosity of 35% and air permeability of 394 sec/100 cc in Example 1); to prepare a solution of a polyethylene composition.

Next, to 100 parts by mass of this solution of the polyethylene composition, 0.125 parts by mass of 2,6-di-tert-butyl-p-cresol and 0.25 parts by mass of tetrakis[methylene-3-(3,5-di-tert-butyl-4-hydroxyphenyl)propionate]methane as antioxidants were added. The resulting mixture was filled into an autoclave equipped with a stirrer, and was stirred for 90 minutes at 200° C., to obtain a substantially homogeneous solution.

The solution was extruded by a T die, using an extruder of 45 mm diameter, and was formed into a gel sheet while being recovered by a cooling roll.

The obtained sheet was set to a biaxial stretching machine, and was subjected to simultaneous biaxial stretching at an elongation temperature and a draw ratio corresponding to desired film thickness, porosity and air permeability (film thickness of 12 μm, porosity of 35% and air permeability of 394 sec/100 cc in Example 1).

The resulting stretched film was washed with methylene chloride, and the remaining liquid paraffin was extracted to be removed, followed by drying the film, to obtain the polyethylene film having the film thickness of 12 μm, the porosity of 35% and the air permeability of 394 sec/100 cc.

[Preparation of Electrolyte Solution]

As the electrolyte solution, one in which the solvent was a mixture of ethylene carbonate (EC) and dimethyl carbonate (DMC) mixed in a proportion of EC:DMC=25:75 by mass ratio, and in which lithium hexafluorophosphate (LiPF$_6$) as a support salt was dissolved at a concentration of 1.1 mol/L in this solvent, was used.

[Assembly of Cell]

The positive electrode and the negative electrode were cut into a predetermined size. To an unformed part of each electrode, where the corresponding active material layer was not formed, a corresponding current collector tab was ultrasonically welded. As the current collector tabs, an aluminum lead piece was used in the positive electrode, and a nickel lead piece was used in the negative electrode. Subsequently, the separator made of the porous polyethylene film was spirally wound while being interposed between the positive electrode and the negative electrode. This spirally wound body was inserted in a battery can, and the negative electrode tab thereof was connected to the bottom of the battery can by resistance welding. A positive electrode lid was connected to the positive electrode tab by ultrasonic welding. Next, the electrolyte solution was injected into the battery can. After that, the battery can was sealed by being caulked with the positive electrode lid. Thus, the lithium-ion secondary battery of interest was obtained.

Example 2

The area density of the positive electrode active material layer was adjusted to 32 mg/cm$^2$. A polyethylene film having a film thickness of 12 μm, a porosity of 42% and an air permeability of 152 sec/100 cc was prepared as the separator. Except for these differences, the lithium-ion secondary battery was prepared in the same manner as in Example 1.

Example 3

The area density of the positive electrode active material layer was adjusted to 33 mg/cm$^2$. A polyethylene film having a film thickness of 12 μm, a porosity of 42% and an air permeability of 113 sec/100 cc was prepared as the separator. Except for these differences, the lithium-ion secondary battery was prepared in the same manner as in Example 1.

Example 4

The area density of the positive electrode active material layer was adjusted to 34 mg/cm$^2$. A polyethylene film having a film thickness of 9 μm, a porosity of 35% and an air permeability of 197 sec/100 cc was prepared as the separator. Except for these differences, the lithium-ion secondary battery was prepared in the same manner as in Example 1.

Example 5

The area density of the positive electrode active material layer was adjusted to 35 mg/cm$^2$. A polyethylene film having a film thickness of 7 μm, a porosity of 32% and an air permeability of 206 sec/100 cc was prepared as the separator. Except for these differences, the lithium-ion secondary battery was prepared in the same manner as in Example 1.

Example 6

The area density of the positive electrode active material layer was adjusted to 37 mg/cm$^2$. A polyethylene film having a film thickness of 16 μm, a porosity of 45% and an air permeability of 166 sec/100 cc was prepared as the separator. Except for these differences, the lithium-ion secondary battery was prepared in the same manner as in Example 1.

Example 7

The area density of the positive electrode active material layer was adjusted to 40 mg/cm$^2$. A polyethylene film having a film thickness of 16 μm, a porosity of 49% and an air permeability of 120 sec/100 cc was prepared as the separator. Except for these differences, the lithium-ion secondary battery was prepared in the same manner as in Example 1.

Example 8

The area density of the positive electrode active material layer was adjusted to 42 mg/cm$^2$. A polyethylene film having a film thickness of 7 μm, a porosity of 44% and an air permeability of 110 sec/100 cc was prepared as the separator. Except for these differences, the lithium-ion secondary battery was prepared in the same manner as in Example 1.

Example 9

The area density of the positive electrode active material layer was adjusted to 43 mg/cm$^2$. A polyethylene film having a film thickness of 5 μm, a porosity of 35% and an air permeability of 119 sec/100 cc was prepared as the separator. Except for these differences, the lithium-ion secondary battery was prepared in the same manner as in Example 1.

Example 10

The area density of the positive electrode active material layer was adjusted to 45 mg/cm$^2$. A polyethylene film having a film thickness of 7 μm, a porosity of 40% and an air permeability of 121 sec/100 cc was prepared as the separator. Except for these differences, the lithium-ion secondary battery was prepared in the same manner as in Example 1.

Example 11

The area density of the positive electrode active material layer was adjusted to 49 mg/cm$^2$. A polyethylene film having a film thickness of 16 μm, a porosity of 46% and an air permeability of 113 sec/100 cc was prepared as the separator. Except for these differences, the lithium-ion secondary battery was prepared in the same manner as in Example 1.

Comparative Example 1

The lithium-ion secondary battery was prepared in the same manner as in Example 1 except that a polyethylene film having a film thickness of 16 μm, a porosity of 36% and an air permeability of 451 sec/100 cc was prepared as the separator.

Comparative Example 2

The lithium-ion secondary battery was prepared in the same manner as in Example 1 except that a polyethylene film having a film thickness of 16 μm, a porosity of 38% and an air permeability of 505 sec/100 cc was prepared as the separator.

Comparative Example 3

The lithium-ion secondary battery was prepared in the same manner as in Example 2 except that a polyethylene film having a film thickness of 16 μm, a porosity of 35% and an air permeability of 445 sec/100 cc was prepared as the separator.

Comparative Example 4

The lithium-ion secondary battery was prepared in the same manner as in Example 3 except that a polyethylene film having a film thickness of 12 μm, a porosity of 35% and an air permeability of 389 sec/100 cc was prepared as the separator.

Comparative Example 5

The lithium-ion secondary battery was prepared in the same manner as in Example 4 except that a polyethylene film having a film thickness of 9 μm, a porosity of 29% and an air permeability of 423 sec/100 cc was prepared as the separator.

Comparative Example 6

The lithium-ion secondary battery was prepared in the same manner as in Example 5 except that a polyethylene film having a film thickness of 12 μm, a porosity of 34% and an air permeability of 405 sec/100 cc was prepared as the separator.

Comparative Example 7

The lithium-ion secondary battery was prepared in the same manner as in Example 6 except that a polyethylene film having a film thickness of 9 μm, a porosity of 33% and an air permeability of 276 sec/100 cc was prepared as the separator.

Comparative Example 8

The lithium-ion secondary battery was prepared in the same manner as in Example 6 except that a polyethylene film having a film thickness of 12 μm, a porosity of 39% and an air permeability of 249 sec/100 cc was prepared as the separator.

Comparative Example 9

The lithium-ion secondary battery was prepared in the same manner as in Example 6 except that a polyethylene film having a film thickness of 16 μm, a porosity of 42% and an air permeability of 235 sec/100 cc was prepared as the separator.

Comparative Example 10

The lithium-ion secondary battery was prepared in the same manner as in Example 7 except that a polyethylene film having a film thickness of 16 μm, a porosity of 42% and an air permeability of 163 sec/100 cc was prepared as the separator.

Comparative Example 11

The lithium-ion secondary battery was prepared in the same manner as in Example 9 except that a polyethylene film having a film thickness of 12 μm, a porosity of 42% and an air permeability of 152 sec/100 cc was prepared as the separator.

Comparative Example 12

The lithium-ion secondary battery was prepared in the same manner as in Example 9 except that a polyethylene film having a film thickness of 9 μm, a porosity of 35% and an air permeability of 197 sec/100 cc was prepared as the separator.

Comparative Example 13

The lithium-ion secondary battery was prepared in the same manner as in Example 9 except that a polyethylene film having a film thickness of 7 μm, a porosity of 32% and an air permeability of 206 sec/100 cc was prepared as the separator.

Comparative Example 14

The lithium-ion secondary battery was prepared in the same manner as in Example 11 except that a polyethylene film having a film thickness of 12 μm, a porosity of 38% and an air permeability of 157 sec/100 cc was prepared as the separator.

Regarding Examples 1 to 11 and Comparative Examples 1 to 14, the porosity ε [%], the air permeability t [sec/100 cc] and the area density of the positive electrode active material layer S [mg/cm²] were measured in the following manner.

[Method for Measuring Porosity]

The porosity of the separator was measured by using a gravimetric method. According to this method, ten areas of the separator were each stamped out in a thickness direction of the separator, into a round shape of 2 cm in diameter; and, a thickness h of the center part of the stamped-out round film and a mass w of the film were measured. Then, by using these thickness h and mass w, a volume V of ten pieces of film of the separator and a mass W of ten pieces of film were determined. The porosity was determined by the following equation.

$$\text{Porosity } [\%] = \{(\rho V - W)/(\rho V)\} \times 100$$

where ρ was a density of the material of the separator.

As a mass measurement device, an electronic balance ("MC210P" manufactured by Sartorius Corporation) was used.

[Method for Measuring Air Permeability]

The air permeability is Gurley permeability. Gurley permeability was measured according to JIS P 8117. Gurley permeability shows the time in seconds for 100 cc of air to pass through a film under the pressure of 1.22 kPa. As a measuring device, an air resistance measuring device ("G-B2C" manufactured by Toyo Seiki Seisaku-Sho, Ltd.) was used.

[Method for Measuring Area Density of Positive Electrode Active Material Layer]

The battery was allowed to be fully-discharged, and then was disassembled. Thus, a positive electrode plate was taken out of the battery. The positive electrode plate was washed with a solvent (DMC: dimethyl carbonate) and then sufficiently dried. The part (the double-side deposited portion), in which the positive electrode active material layers were provided on both of the surfaces of the positive electrode current collector, was stamped out in a predetermined area (area stamped out). Then, a mass [mg] (referred to as "mass A") of its stamped-out part was measured. In a similar manner, a part of the positive electrode current collector where neither of the surfaces were provided with any positive electrode mixture layer was stamped out, and a mass [mg] (referred to as "mass B") of its stamped-out part was measured. The area density was calculated by the following equation.

$$\text{Area density } [\text{mg/cm}^2] = (\text{mass } A - \text{mass } B) \div \text{area stamped out}$$

[Evaluation]

In order to evaluate high output characteristics of the prepared batteries, the following high-load charging and discharging test was carried out.

[High-Load Charging and Discharging Test]

The prepared battery was charged at a constant current of 0.1 C until it reached a voltage of 4.2 V, followed by charging at a constant voltage of 4.2 V for 2.5 hours. Then, after a 30-minute pause, the battery was discharged at a constant current of 0.1 C until it reached a voltage of 2.5 V. This operation was performed twice, and a discharge capacity after the second operation was obtained as a low-load discharge capacity of the battery. Next, after charging the same battery under the above-mentioned conditions, the battery was discharged at a constant current of 12 C and its high-load discharge capacity was determined.

Then, {(high-load discharge capacity)÷(low-load discharge capacity)}×100 [%] was calculated as the battery's capacity retention ratio [%] in high-load discharge.

Incidentally, 1 C is an amount of current that can fully charge (or discharge) the theoretical capacity in one hour. Accordingly, 0.1 C is an amount of current that can fully charge (or discharge) the theoretical capacity in ten hours, and 12 C is an amount of current that can fully charge (or discharge) the theoretical capacity in five minutes. The amount of current of 12 C is 120 times as large as that of 0.1 C.

The results of measurement and evaluation regarding Examples 1 to 11 and Comparative Examples 1 to 14 are shown in Table 1.

TABLE 1

| | Positive electrode | | Separator | | | |
|---|---|---|---|---|---|---|
| | Positive electrode active material | Area density S [mg/cm²] | Film thickness [μm] | Porosity ε [%] | Air permeability t [sec/100 cc] | Capacity retention ratio [%] |
| Ex. 1 | $LiNi_{0.80}Co_{0.15}Al_{0.05}O_2$ | 31 | 12 | 35 | 394 | 80 |
| Ex. 2 | $LiNi_{0.80}Co_{0.15}Al_{0.05}O_2$ | 32 | 12 | 42 | 152 | 81 |
| Ex. 3 | $LiNi_{0.80}Co_{0.15}Al_{0.05}O_2$ | 33 | 12 | 42 | 113 | 81 |
| Ex. 4 | $LiNi_{0.80}Co_{0.15}Al_{0.05}O_2$ | 34 | 9 | 35 | 197 | 76 |
| Ex. 5 | $LiNi_{0.80}Co_{0.15}Al_{0.05}O_2$ | 35 | 7 | 32 | 206 | 74 |
| Ex. 6 | $LiNi_{0.80}Co_{0.15}Al_{0.05}O_2$ | 37 | 16 | 45 | 166 | 78 |
| Ex. 7 | $LiNi_{0.80}Co_{0.15}Al_{0.05}O_2$ | 40 | 16 | 49 | 120 | 70 |
| Ex. 8 | $LiNi_{0.80}Co_{0.15}Al_{0.05}O_2$ | 42 | 7 | 44 | 110 | 66 |

TABLE 1-continued

| | Positive electrode | | Separator | | | |
|---|---|---|---|---|---|---|
| | Positive electrode active material | Area density S [mg/cm$^2$] | Film thickness [μm] | Porosity ε [%] | Air permeability t [sec/100 cc] | Capacity retention ratio [%] |
| Ex. 9 | LiNi$_{0.80}$Co$_{0.15}$Al$_{0.05}$O$_2$ | 43 | 5 | 35 | 119 | 60 |
| Ex. 10 | LiNi$_{0.80}$Co$_{0.15}$Al$_{0.05}$O$_2$ | 45 | 7 | 40 | 121 | 62 |
| Ex. 11 | LiNi$_{0.80}$Co$_{0.15}$Al$_{0.05}$O$_2$ | 49 | 16 | 46 | 113 | 60 |
| Comp. Ex. 1 | LiNi$_{0.80}$Co$_{0.15}$Al$_{0.05}$O$_2$ | 31 | 16 | 36 | 451 | 57 |
| Comp. Ex. 2 | LiNi$_{0.80}$Co$_{0.15}$Al$_{0.05}$O$_2$ | 31 | 16 | 38 | 505 | 31 |
| Comp. Ex. 3 | LiNi$_{0.80}$Co$_{0.15}$Al$_{0.05}$O$_2$ | 32 | 16 | 35 | 445 | 38 |
| Comp. Ex. 4 | LiNi$_{0.80}$Co$_{0.15}$Al$_{0.05}$O$_2$ | 33 | 12 | 35 | 389 | 46 |
| Comp. Ex. 5 | LiNi$_{0.80}$Co$_{0.15}$Al$_{0.05}$O$_2$ | 34 | 9 | 29 | 423 | 28 |
| Comp. Ex. 6 | LiNi$_{0.80}$Co$_{0.15}$Al$_{0.05}$O$_2$ | 35 | 12 | 34 | 405 | 43 |
| Comp. Ex. 7 | LiNi$_{0.80}$Co$_{0.15}$Al$_{0.05}$O$_2$ | 37 | 9 | 33 | 276 | 41 |
| Comp. Ex. 8 | LiNi$_{0.80}$Co$_{0.15}$Al$_{0.05}$O$_2$ | 37 | 12 | 39 | 249 | 40 |
| Comp. Ex. 9 | LiNi$_{0.80}$Co$_{0.15}$Al$_{0.05}$O$_2$ | 37 | 16 | 42 | 235 | 32 |
| Comp. Ex. 10 | LiNi$_{0.80}$Co$_{0.15}$Al$_{0.05}$O$_2$ | 40 | 16 | 42 | 163 | 52 |
| Comp. Ex. 11 | LiNi$_{0.80}$Co$_{0.15}$Al$_{0.05}$O$_2$ | 43 | 12 | 42 | 152 | 56 |
| Comp. Ex. 12 | LiNi$_{0.80}$Co$_{0.15}$Al$_{0.05}$O$_2$ | 43 | 9 | 35 | 197 | 52 |
| Comp. Ex. 13 | LiNi$_{0.80}$Co$_{0.15}$Al$_{0.05}$O$_2$ | 43 | 7 | 32 | 206 | 50 |
| Comp. Ex. 14 | LiNi$_{0.80}$Co$_{0.15}$Al$_{0.05}$O$_2$ | 49 | 12 | 38 | 157 | 46 |

Figure 7:
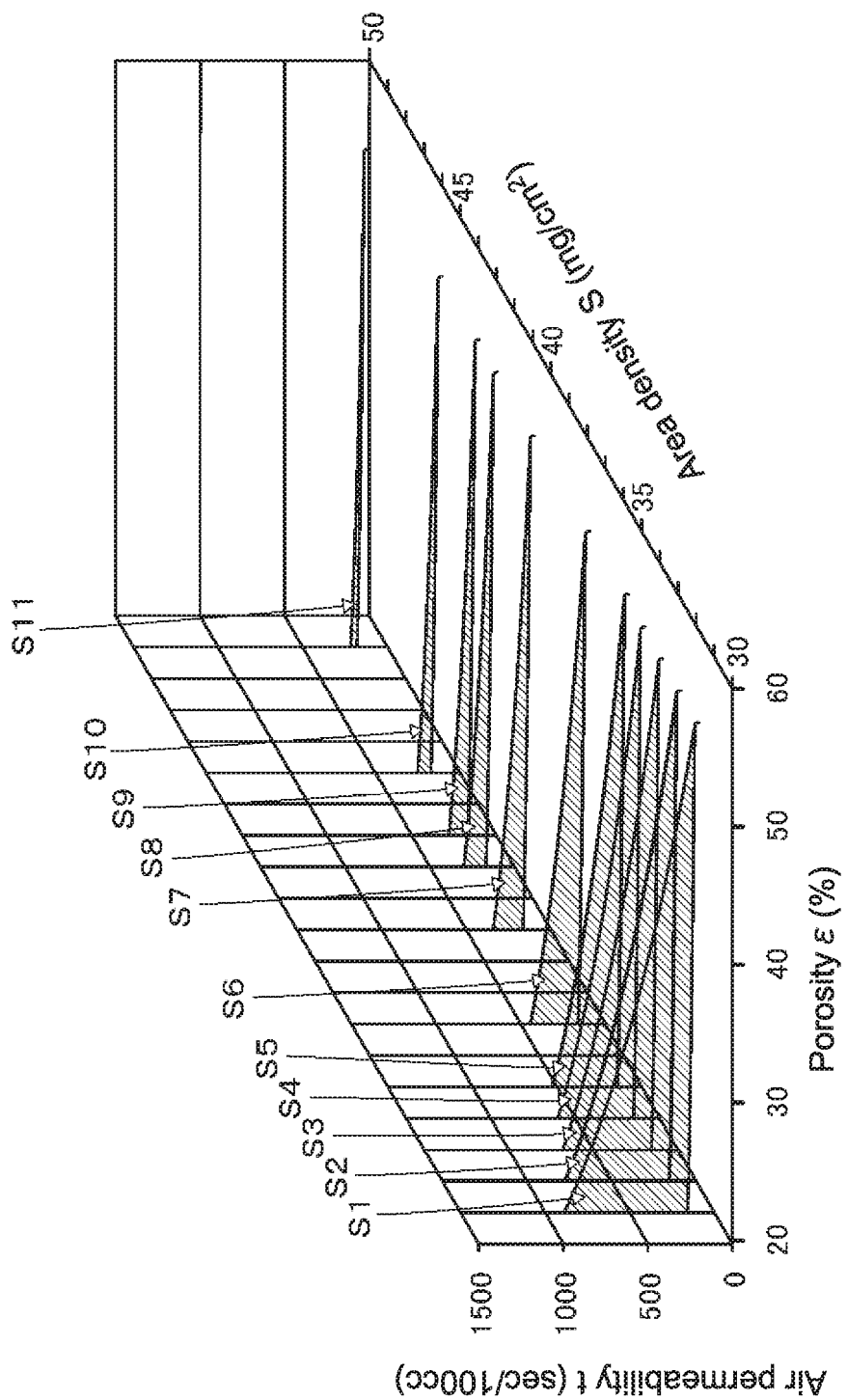
FIG. 7 is a graph showing a region that satisfies the formulae in a t-ε-S three dimensional coordinate of an air permeability (t), a porosity (ε), and an area density (S)

In addition, FIGS. 7 to 13 show some graphs for facilitating understanding whether or not these Examples and Comparative Examples satisfy the following formulae. FIG. 7 shows a t-ε-S three dimensional coordinate of the air permeability (t), the porosity (ε), and the area density (S). FIGS. 8A to 13 each show the corresponding ε-t plane when the area density (S) was a predetermined value (31 mg/cm$^2$, 32 mg/cm$^2$, 33 mg/cm$^2$, 34 mg/cm$^2$, 35 mg/cm$^2$, 37 mg/cm$^2$, 40 mg/cm$^2$, 42 mg/cm$^2$, 43 mg/cm$^2$, 45 mg/cm$^2$ or 49 mg/cm$^2$).

$$t = a \times \mathrm{Ln}(\varepsilon) - 4.02a + 100$$

and $$-1.87 \times 10^{10} \times S^{-4.96} \leq a \leq -40 \quad \text{[Formulae]}$$

where ε is the porosity [%], t is the air permeability [sec/100 cc], S is the area density of the positive electrode active material layer [mg/cm$^2$] and Ln is natural logarithm.

In FIG. 7, regions S1 to S11 show the ranges of the air permeability (t) and the porosity (ε) that would satisfy the formulae when the value S was a corresponding predetermined value of the above. Further, on the ε-t plane coordinates of FIGS. 8A to 13, the measured values regarding the Examples and Comparative Examples were plotted. When the plotted point is within the ranges of the regions S1 to S11, it means that the separator (polyethylene film) satisfies the formulae. When the plotted point is outside the ranges of the regions S1 to S11, it means that the separator (polyethylene film) does not satisfy the formulae.

It should be noted that the ε-t plane coordinates (ε-t planes) of FIGS. 8A to 13 each show the corresponding ε-t plane coordinate in the cases where the area densities (S) were as follows.

Figure 8A:
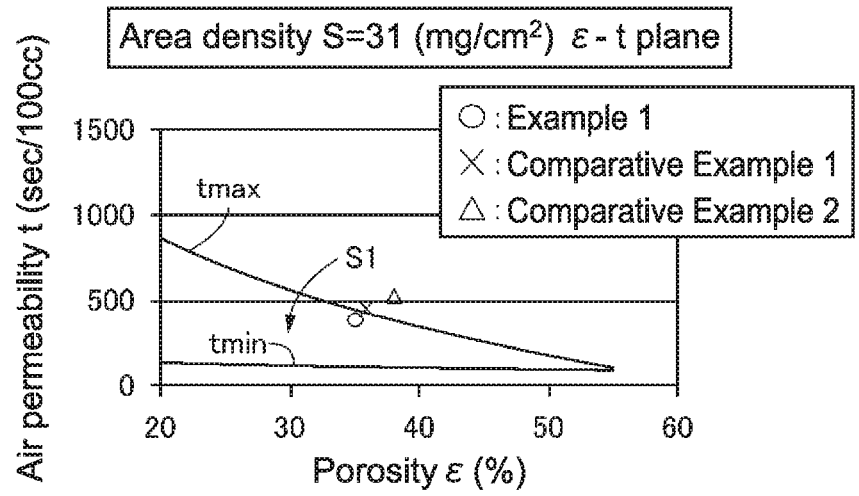
FIG. 8A is a graph obtained by plotting the measured values regarding the separators of Example 1 and Comparative Examples 1 and 2 on an ε-t plane coordinate of an area density (S)=31 mg/cm$^2$.
Figure 8B:
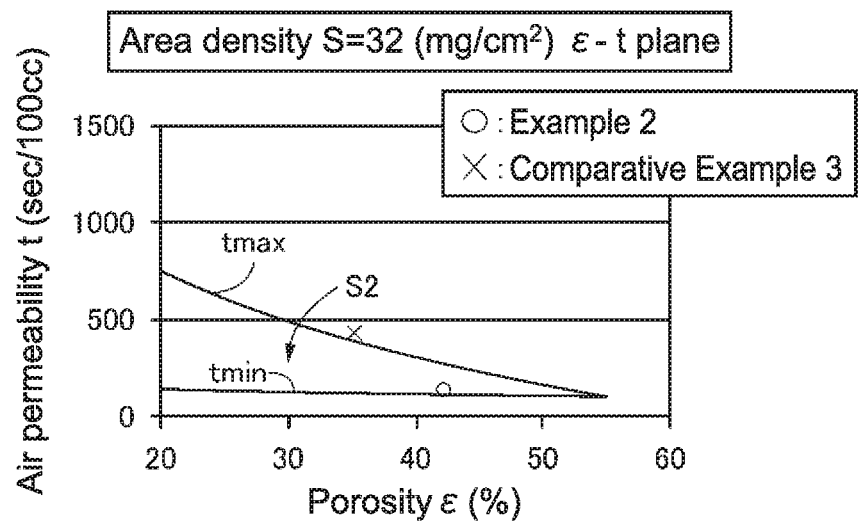
FIG. 8B is a graph obtained by plotting the measured values regarding the separators of Example 2 and Comparative Example 3 on an ε-t plane coordinate of an area density (S)=32 mg/cm$^2$.

FIG. 8A is the ε-t plane coordinate in which S=31 [mg/cm$^2$]. FIG. 8B is the ε-t plane coordinate in which S=32 [mg/cm$^2$].

Figure 9A:
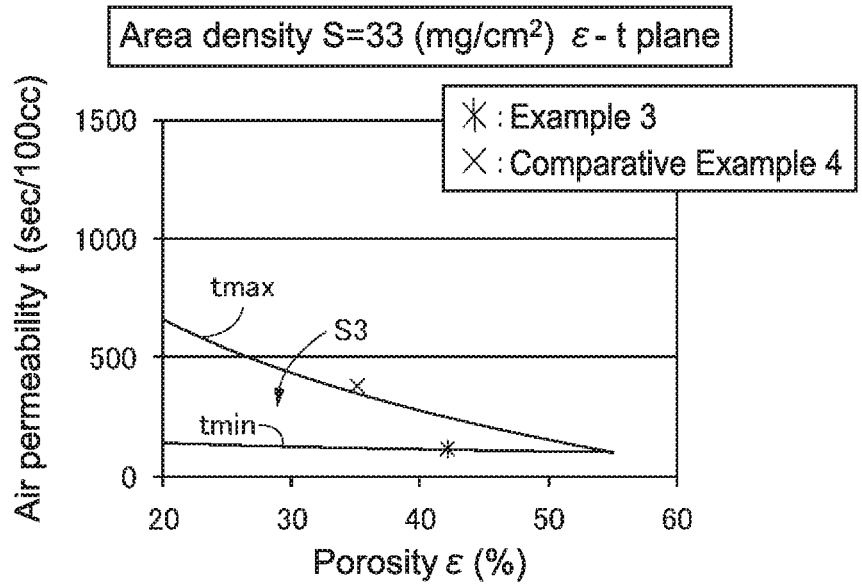
FIG. 9A is a graph obtained by plotting the measured values regarding the separators of Example 3 and Comparative Example 4 on an ε-t plane coordinate of an area density (S)=33 mg/cm$^2$.
Figure 9B:
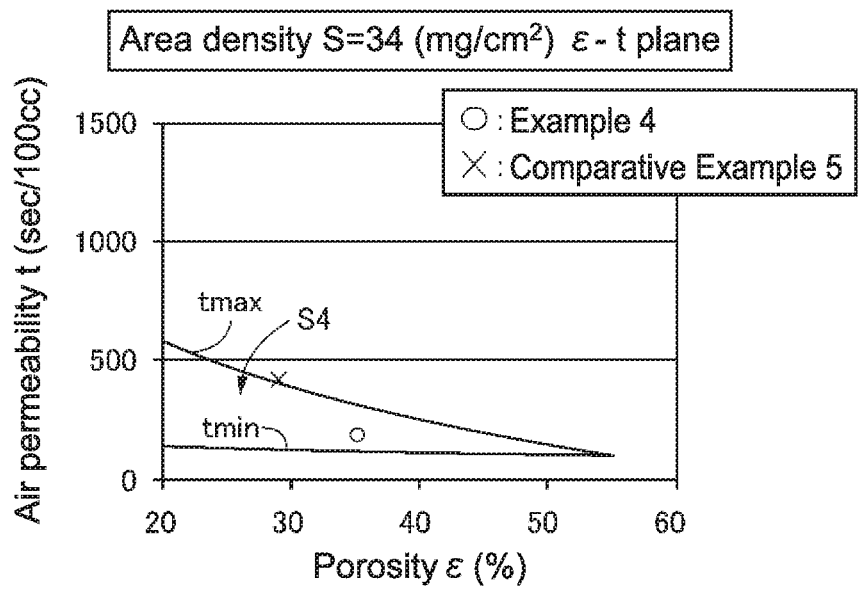
FIG. 9B is a graph obtained by plotting the measured values regarding the separators of Example 4 and Comparative Example 5 on an ε-t plane coordinate of an area density (S)=34 mg/cm$^2$.

FIG. 9A is the ε-t plane coordinate in which S=33 [mg/cm$^2$]. FIG. 9B is the ε-t plane coordinate in which S=34 [mg/cm$^2$].

Figure 10A:
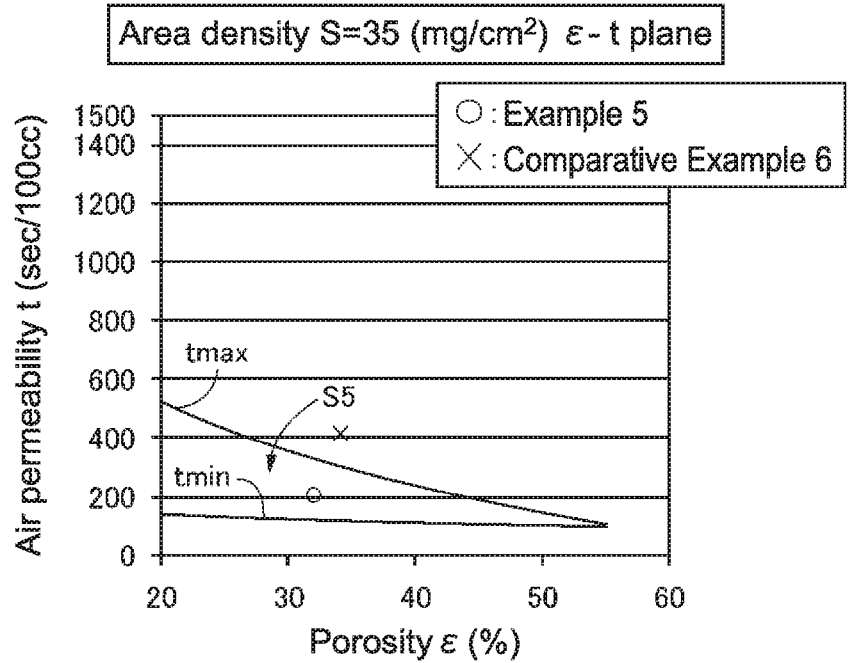
FIG. 10A is a graph obtained by plotting the measured values regarding the separators of Example 5 and Comparative Example 6 on an ϵ-t plane coordinate of an area density (S)=35 mg/cm$^2$.
Figure 10B:
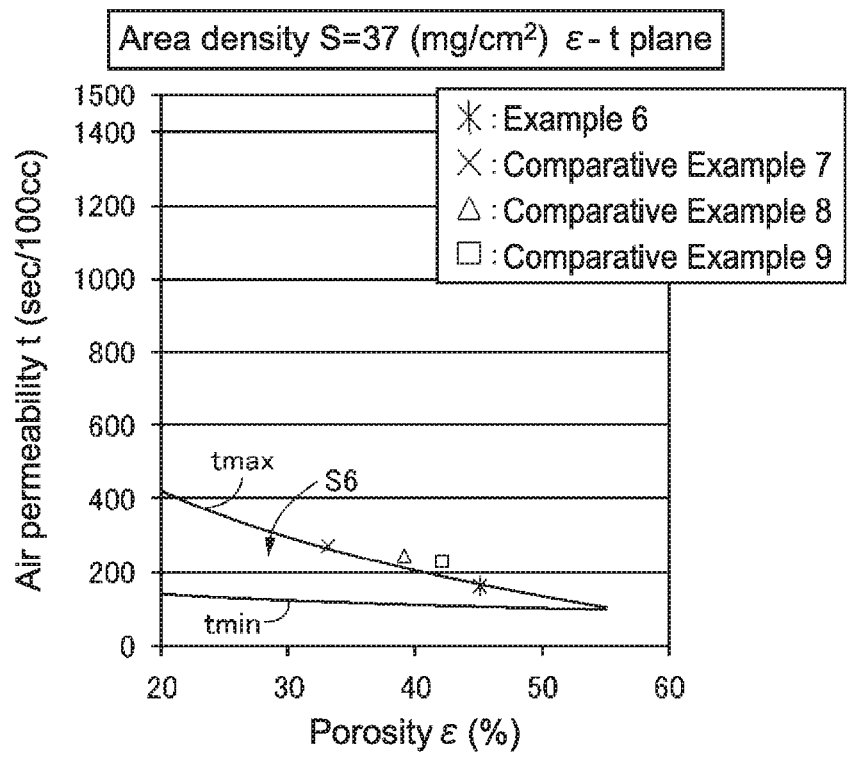
FIG. 10B is a graph obtained by plotting the measured values regarding the separators of Example 6 and Comparative Examples 7 to 9 on an ϵ-t plane coordinate of an area density (S)=37 mg/cm$^2$.

FIG. 10A is the ε-t plane coordinate in which S=35 [mg/cm$^2$]. FIG. 10B is the ε-t plane coordinate in which S=37 [mg/cm$^2$].

Figure 11A:
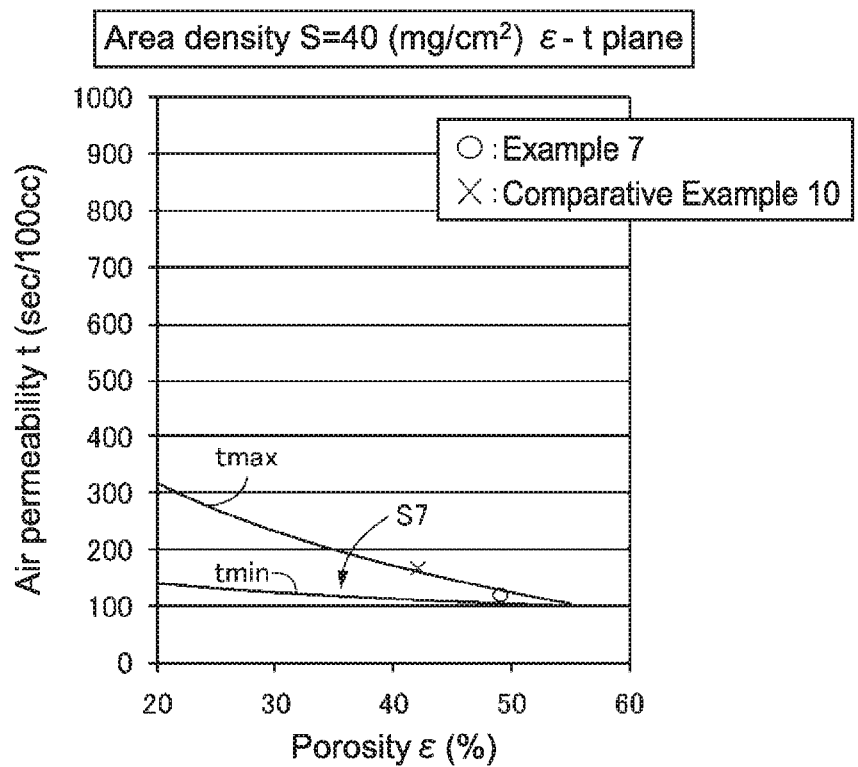
FIG. 11A is a graph obtained by plotting the measured values regarding the separators of Example 7 and Comparative Example 10 on an ϵ-t plane coordinate of an area density (S)=40 mg/cm$^2$.
Figure 11B:
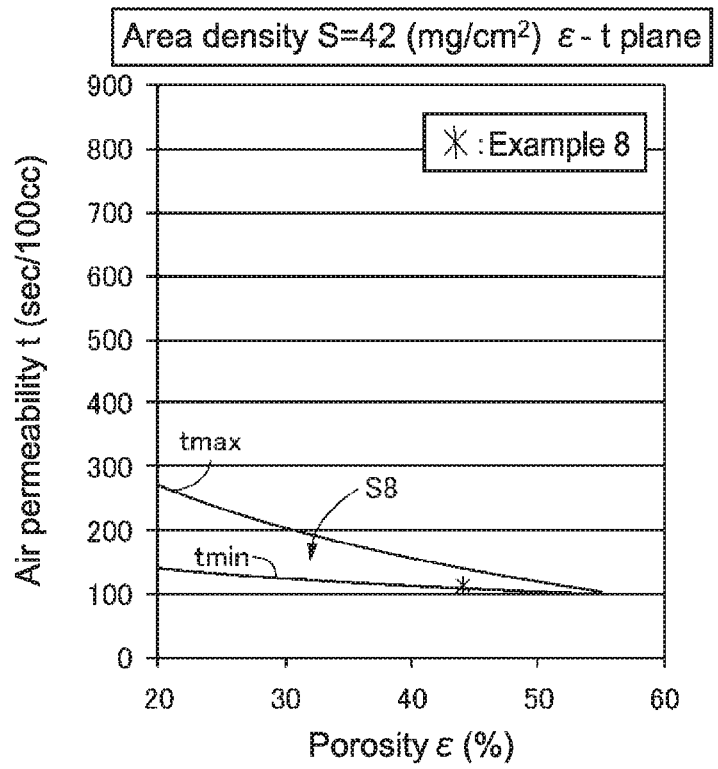
FIG. 11B is a graph obtained by plotting the measured values regarding the separator of Example 8 on an ϵ-t plane coordinate of an area density (S)=42 mg/cm$^2$.

FIG. 11A is the ε-t plane coordinate in which S=40 [mg/cm$^2$]. FIG. 11B is the ε-t plane coordinate in which S=42 [mg/cm$^2$].

Figure 12A:
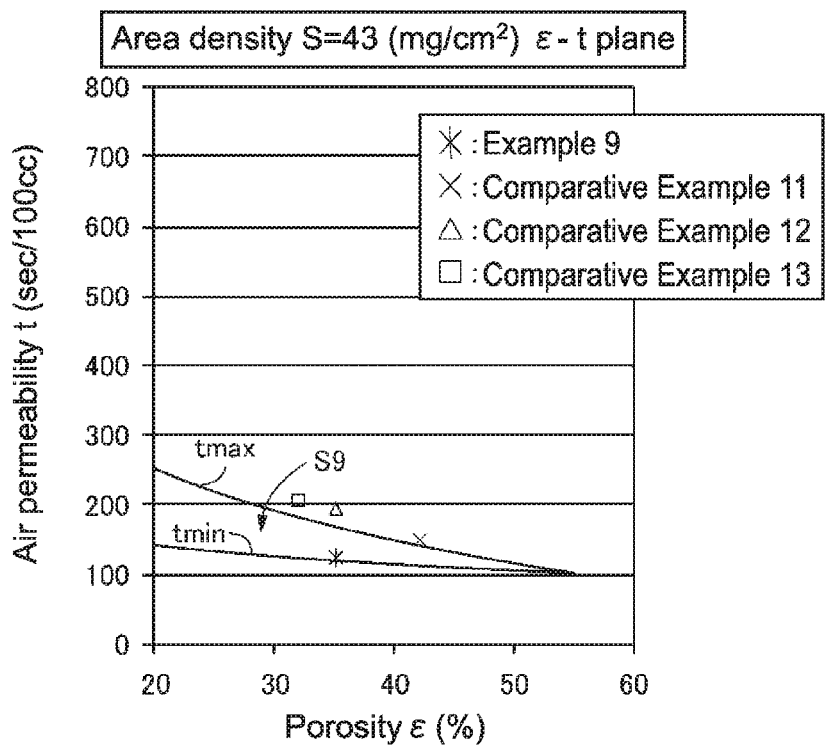
FIG. 12A is a graph obtained by plotting the measured values regarding the separators of Example 9 and Comparative Examples 11 to 13 on an ϵ-t plane coordinate of an area density (S)=43 mg/cm$^2$.
Figure 12B:
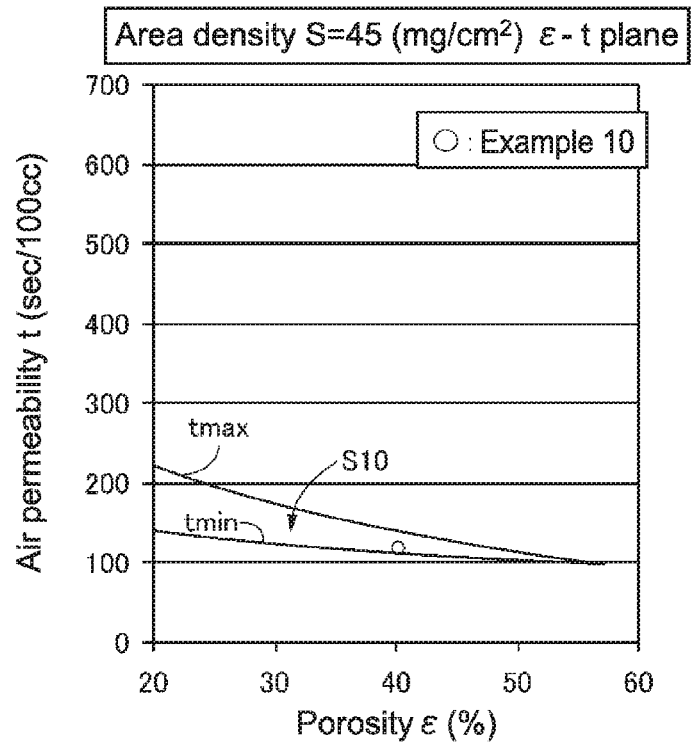
FIG. 12B is a graph obtained by plotting the measured values regarding the separator of Example 10 on an ϵ-t plane coordinate of an area density (S)=45 mg/cm$^2$.

FIG. 12A is the ε-t plane coordinate in which S=43 [mg/cm$^2$]. FIG. 12B is the ε-t plane coordinate in which S=45 [mg/cm$^2$].

Figure 13:
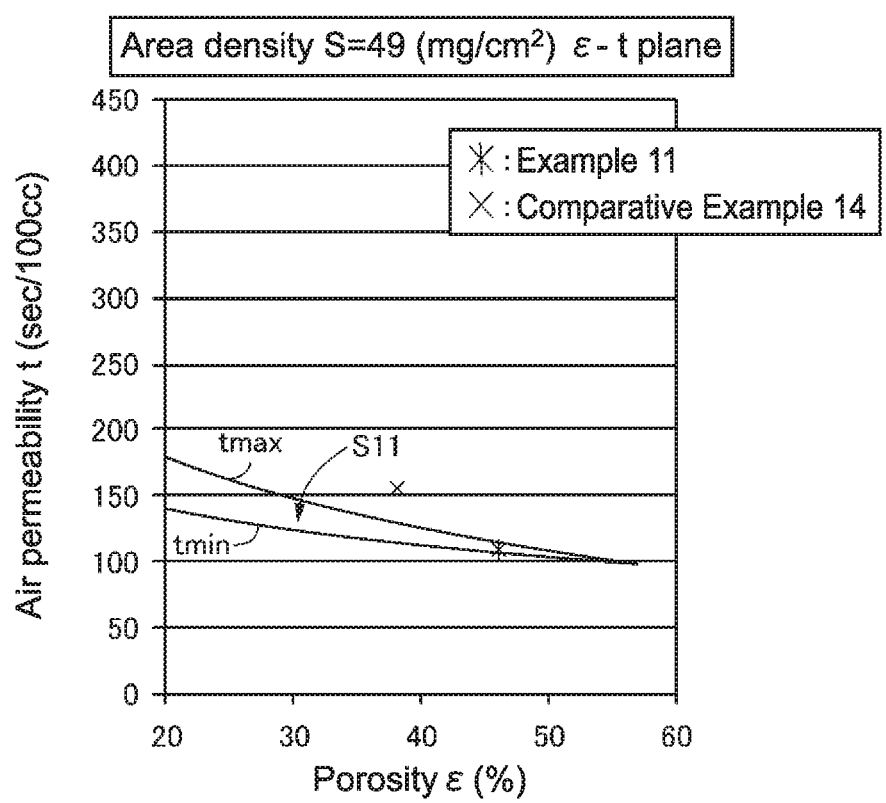
FIG. 13 is a graph obtained by plotting the measured values regarding the separators of Example 11 and Comparative Example 14 on an ϵ-t plane coordinate of an area density (S)=49 mg/cm$^2$.

FIG. 13 is the ε-t plane coordinate in which S=49 [mg/cm$^2$].

Further, the regions S1 to S11, tmin, and tmax shown in FIGS. 8A to 13 are those which were derived according to the above formulae. In the following, relational expressions regarding the regions S1 to S11, tmin, and tmax will be described. Incidentally, in cases where the air permeability t [sec/100 cc] of the porous film in the separator is smaller than tmin, it becomes difficult to ensure an appropriate shutdown function, and this may have a tendency to lower the safety of the battery.

[Region S1]

Region S1: S=31 [mg/cm$^2$], tmin≤t≤tmax tmin: $a \times \mathrm{Ln}(\varepsilon) - 4.02a + 100 (a=-40)$ tmax: $a \times \mathrm{Ln}(\varepsilon) - 4.02a + 100 (a=-1.87 \times 10^{10} \times 31^{-4.96})$

[Region S2]

Region S2: S=32 [mg/cm$^2$], tmin≤t≤tmax tmin: $a \times \mathrm{Ln}(\varepsilon) - 4.02a + 100 (a=-40)$ tmax: $a \times \mathrm{Ln}(\varepsilon) - 4.02a + 100 (a=-1.87 \times 10^{10} \times 32^{-4.96})$

[Region S3]

Region S3: S=33 [mg/cm$^2$], tmin≤t≤tmax tmin: $a \times \mathrm{Ln}(\varepsilon) - 4.02a + 100 (a=-40)$ tmax: $a \times \mathrm{Ln}(\varepsilon) - 4.02a + 100 (a=-1.87 \times 10^{10} \times 33^{-4.96})$

[Region S4]

Region S4: S=34 [mg/cm$^2$], tmin≤t≤tmax tmin: $a \times \mathrm{Ln}(\varepsilon) - 4.02a + 100 (a=-40)$ $t\max: a \times \mathrm{Ln}(\epsilon) - 4.02a + 100 (a = -1.87 \times 10^{10} \times 34^{-4.96})$

[Region S5]

Region S5: $S=35$ [mg/cm$^2$], $t\min \leq t \leq t\max$ $t\min: a \times \mathrm{Ln}(\epsilon) - 4.02a + 100 (a = -40)$ $t\max: a \times \mathrm{Ln}(\epsilon) - 4.02a + 100 (a = -1.87 \times 10^{10} \times 35^{-4.96})$

[Region S6]

Region S6: $S=37$ [mg/cm$^2$], $t\min \leq t \leq t\max$ $t\min: a \times \mathrm{Ln}(\epsilon) - 4.02a + 100 (a = -40)$ $t\max: a \times \mathrm{Ln}(\epsilon) - 4.02a + 100 (a = -1.87 \times 10^{10} \times 37^{-4.96})$

[Region S7]

Region S7: $S=40$ [mg/cm$^2$], $t\min \leq t \leq t\max$ $t\min: a \times \mathrm{Ln}(\epsilon) - 4.02a + 100 (a = -40)$ $t\max: a \times \mathrm{Ln}(\epsilon) - 4.02a + 100 (a = -1.87 \times 10^{10} \times 40^{-4.96})$

[Region S8]

Region S8: $S=42$ [mg/cm$^2$], $t\min \leq t \leq t\max$ $t\min: a \times \mathrm{Ln}(\epsilon) - 4.02a + 100 (a = -40)$ $t\max: a \times \mathrm{Ln}(\epsilon) - 4.02a + 100 (a = -1.87 \times 10^{10} \times 42^{-4.96})$

[Region S9]

Region S9: $S=43$ [mg/cm$^2$], $t\min \leq t \leq t\max$ $t\min: a \times \mathrm{Ln}(\epsilon) - 4.02a + 100 (a = -40)$ $t\max: a \times \mathrm{Ln}(\epsilon) - 4.02a + 100 (a = -1.87 \times 10^{10} \times 43^{-4.96})$

[Region S10]

Region S10: $S=45$ [mg/cm$^2$], $t\min \leq t \leq t\max$ $t\min: a \times \mathrm{Ln}(\epsilon) - 4.02a + 100 (a = -40)$ $t\max: a \times \mathrm{Ln}(\epsilon) - 4.02a + 100 (a = -1.87 \times 10^{10} \times 45^{-4.96})$

[Region S11]

Region S11: $S=49$ [mg/cm$^2$], $t\min \leq t \leq t\max$ $t\min: a \times \mathrm{Ln}(\epsilon) - 4.02a + 100 (a = -40)$ $t\max: a \times \mathrm{Ln}(\epsilon) - 4.02a + 100 (a = -1.87 \times 10^{10} \times 49^{-4.96})$ As shown in Table 1 and FIGS. 7 to 13, Examples 1 to 11 which satisfied the conditions of the above formulae had good high-load discharge performance. In contrast, Comparative Examples 1 to 14 which did not satisfy the conditions of the above formulae did not have good high-load discharge performance. Incidentally, regarding the capacity retention ratio in high-load discharge tests, since the capacity retention ratio demanded by ordinary users were about 60%, this value (60%) was used as a baseline to determine if the high-load discharge performance was good in this evaluation.

4. Other Embodiments

The present disclosure is not limited to the above-described embodiments, but various modifications and alternatives of the embodiments may be made within the scope not departing from the gist of the present disclosure.

For example, in the above-described embodiments and Examples, numerical values, structures, shapes, materials, raw materials, production processes and the like are illustrative only, and numerical values, structures, shapes, materials, raw materials, production processes and the like, which are different from those described above, may be used as appropriate.

Moreover, the configurations, the methods, the processes, the shapes, the materials, the numerical values and the like in the foregoing embodiments and Examples may be combined with each other without departing from the gist of the present disclosure.

The battery according to any of the above-described embodiments is not limited to a secondary battery, but may be applied to a primary battery as well.

The above-mentioned embodiments and Examples have been described by illustrating a battery having a cylindrical-type structure with a spiral structure in which the electrodes are spirally wound, but the present disclosure is not limited to these batteries. For example, embodiments of the present disclosure may be applied to a laminated film type battery that includes laminated films used as its exterior; a stacked type battery having a structure in which the electrodes are stacked; a square-type; a coin-type; a flat-type; a button-type; or other structure types of batteries as well. Examples of structures of the stacked type may include a battery structure in which positive and negative electrodes are laminated with separator sheets interposed therebetween; a battery structure in which positive and negative electrodes are laminated with a separator folded in a zigzag form interposed therebetween; a battery structure in which positive and negative electrodes are laminated with a pair of separators sandwiching a negative electrode, which pair of separators are folded in a zigzag form, being interposed therebetween; and the like.

Further, as the electrolyte, a gel electrolyte in which the non-aqueous electrolyte solution is held by a polymer compound may also be used. Examples of the polymer compounds for holding the non-aqueous electrolyte solution include a fluorine-containing polymer compound such as a copolymer including polyvinylidene fluoride (PVdF) or vinylidene fluoride (VdF) and hexafluoropropylene (HFP) in its repeat unit; an ether-based polymer compound such as polyethylene oxide (PEO) and cross-linked products containing polyethylene oxide (PEO); a polymer compound including polyacrylonitrile (PAN), polypropylene oxide (PPO) or polymethyl methacrylate (PMMA) as its repeat unit; and other polymer compounds that may absorb the non-aqueous electrolyte solution and form a gel structure. Any one kind of the polymer compounds may be used singly, or may be used in mixtures of two or more thereof.

In particular, the fluorine-containing polymer compound may be desirable in terms of oxidation-reduction stability. Among the above, the copolymer including vinylidene fluoride and hexafluoropropylene as its component may be desirable. Furthermore, this copolymer may contain, as its component, a monoester of an unsaturated dibasic acid such as monomethyl maleate (MMM); a halogenated ethylene such as chlorotrifluoroethylene (PCTFE); a cyclic ester carbonate of an unsaturated compound such as vinylene carbonate (VC); an epoxy group-containing acryl vinyl monomer; or the like. This is because improved characteristics can be obtained.

In addition, as the electrolyte, a solid electrolyte or the like may be used. The electrolyte may include an ionic liquid (ambient temperature molten salt).

According to the above-described embodiments of the present disclosure, it makes it possible to prevent lowering of capacity when a battery is discharged at high output, and thus provide a battery having high capacity and high power. Further, by suppressing an increase in inner resistance, it is possible to suppress generation of Joule heat associated with discharging, and suppress generation of heat during high-load discharge. This may reduce a risk of short-circuiting between positive and negative electrodes due to shrinkage of the separator by heat generated during high-load discharge.

The present disclosure may employ the following configurations.

[1] A battery, including:
  a positive electrode including a positive electrode current collector having a pair of surfaces, and a positive electrode active material layer provided on each of the surfaces of the positive electrode current collector, the positive electrode active material layer containing a positive electrode active material,
    the positive electrode active material having at least one compound selected from the group consisting of:
      a lithium nickel composite oxide having nickel as a main component, the lithium nickel composite oxide having a layer structure, the lithium nickel composite oxide containing at least lithium and nickel with a high content of nickel;
      a lithium nickel cobalt manganese composite oxide having a layer structure, the lithium nickel cobalt manganese composite oxide containing at least lithium, nickel, cobalt and manganese with a low content of nickel;
      a lithium manganese composite oxide having a spinel structure, the lithium manganese composite oxide containing at least lithium and manganese; and
      a lithium iron phosphate compound having an olivine structure, the lithium iron phosphate compound containing at least lithium, iron and phosphorus,
    the positive electrode active material layer having an area density S [mg/cm$^2$] more than or equal to 30 mg/cm$^2$;
  a negative electrode;
  a separator at least including a porous film,
    the porous film having a porosity $\epsilon$ [%] and an air permeability t [sec/100 cc] which satisfy formulae of:

$$t = a \times \mathrm{Ln}(\epsilon) - 4.02a + 100$$

and $$-1.87 \times 10^{10} \times S^{-4.96} \leq a \leq -40$$

where $\epsilon$ is the porosity [%], t is the air permeability [sec/100 cc], S is the area density of the positive electrode active material layer [mg/cm$^2$] and Ln is natural logarithm;
  and
  an electrolyte.

[2] The battery according to [1], in which
  the positive electrode active material layer has an area density less than or equal to 50 mg/cm$^2$.

[3] The battery according to [1] or [2], in which
  the lithium nickel composite oxide having nickel as a main component includes at least one composite oxide represented by the following formula (1):

$$Li_x Ni_y Co_z M1_{(1-y-z)} O_b \quad (1)$$

where M1 represents at least one element selected from the group consisting of boron (B), magnesium (Mg), aluminum (Al), silicon (Si), phosphorus (P), sulfur (S), titanium (Ti), chromium (Cr), manganese (Mn), iron (Fe), copper (Cu), zinc (Zn), gallium (Ga), germanium (Ge), yttrium (Y), zirconium (Zr), molybdenum (Mo), silver (Ag), barium (Ba), tungsten (W), indium (In), tin (Sn), lead (Pb) and antimony (Sb);
  x, y, z and b are values within ranges of $0.8 < x \leq 1.2$, $0.5 \leq y \leq 1.0$, $0 \leq Z \leq 0.5$, $y + z \leq 1$ and $1.8 \leq b \leq 2.2$; and
  the composition of lithium varies depending on the charging and discharging state, and the value of x indicates the value in the fully-discharged state.

[4] The battery according to any one of [1] to [3], in which
  the lithium nickel cobalt manganese composite oxide includes at least one composite oxide represented by the following formula (2):

$$Li_f Ni_g Co_i Mn_{(1-g-i-h)} M2_h O_{(2-j)} \quad (2)$$

where M2 represents at least one element selected from the group consisting of magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr) and tungsten (W);
  f, g, h, j and i are values within ranges of $0.8 \leq f \leq 1.2$, $0 < g \leq 0.5$, $0 \leq h \leq 0.5$, $g + h + i < 1$, $-0.1 \leq j \leq 0.2$ and $0 < i \leq 0.5$; and
  the composition of lithium varies depending on the charging and discharging state, and the value of f indicates the value in the fully-discharged state.

[5] The battery according to any one of [1] to [4], in which
  the lithium manganese composite oxide includes at least one composite oxide represented by the following formula (3):

$$Li_v Ni_{(2-w)} M3_w O_s \quad (3)$$

where M3 represents at least one element selected from the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W);
  v, w and s are values within ranges of $0.9 \leq v \leq 1.1$, $0 \leq w \leq 0.6$ and $3.7 \leq s \leq 4.1$; and
  the composition of lithium varies depending on the charging and discharging state, and the value of v indicates the value in the fully-discharged state.

[6] The battery according to any one of [1] to [5], in which
  the lithium iron phosphate compound includes at least one phosphate compound represented by the following formula (4):

$$Li_u Fe_r M4_{(1-r)} PO_4 \quad (4)$$

where M4 represents at least one element selected from the group consisting of cobalt (Co), manganese (Mn), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W) and zirconium (Zr);

r and u are values within ranges of $0<r\leq1$ and $0.9\leq u\leq1.1$; and the composition of lithium varies depending on the charging and discharging state, and the value of u indicates the value in the fully-discharged state.

[7] The battery according to any one of [1] to [6], in which
the positive electrode active material contains, as the lithium nickel composite oxide having nickel as a main component, a compound of:

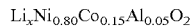

$Li_xNi_{0.80}Co_{0.15}Al_{0.05}O_2$ where x is a value within a range of $0.8<x\leq1.2$; and the composition of lithium varies depending on the charging and discharging state, and the value of x indicates the value in the fully-discharged state; and a content of $Li_xNi_{0.80}Co_{0.15}Al_{0.05}O_2$ is 80% by mass or more and 98% by mass or less of a total mass of the positive electrode active material.

[8] The battery according to any one of [1], [2], [4] and [5], in which
the positive electrode active material is a mixture of the lithium nickel cobalt manganese composite oxide and the lithium manganese composite oxide, and a mass ratio of a mass of the lithium nickel cobalt manganese composite oxide:a mass of the lithium manganese composite oxide in the mixture is in a range of from 5:5 to 9:1.

[9] The battery according to any one of [1], [2], [3] and [5], in which
the positive electrode active material is
the lithium nickel composite oxide having nickel as a main component, or
a mixture of the lithium nickel composite oxide having nickel as a main component and the lithium manganese composite oxide, and
a mass ratio of a mass of the lithium nickel composite oxide having nickel as a main component:a mass of the lithium manganese composite oxide in the positive electrode active material is in a range of from 5:5 to 10:0.

[10] The battery according to any one of [1] to [9], in which
the porous film has at least one main surface, and
the separator further includes a surface layer containing particles and a resin, provided on at least one surface of the porous film.

[11] The battery according to any one of [1] to [10], in which
the porous film is a polyolefin resin film.

[12] The battery according to any one of [1] to [11], in which
the separator has a thickness of 3 μm or more and 18 μm or less. [13] A battery pack, including:
the battery according to any one of [1] to [12];
a control unit configured to control the battery; and
an exterior configured to contain the battery.

[14] An electronic apparatus, including:
the battery according to any one of [1] to [12],
the electronic apparatus being configured to receive electricity supply from the battery.

[15] An electric vehicle, including:
the battery according to any one of [1] to [12];
a converter configured to
receive electricity supply from the battery and
convert the electricity into driving force for vehicle; and
a controller configured to process information on vehicle control on the basis of information on the battery.

[16] An electrical storage apparatus, including:
the battery according to any one of [1] to [12],
the electrical storage apparatus being configured to provide electricity to an electronic apparatus connected to the battery.

[17] The electrical storage apparatus according to [16], further including:
an electricity information controlling device configured to transmit and receive signals via a network to and from other apparatus,
the electrical storage apparatus being configured to control charge and discharge of the battery on the basis of information that the electricity information controlling device receives.

[18] An electricity system, configured to
receive electricity supply from the battery according to any one of [1] to [12]; or
provide electricity from at least one of a power generating device and a power network to the battery.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:
1. A battery, comprising:
a positive electrode including a positive electrode active material layer provided on a positive electrode current collector;
a negative electrode; and
a separator at least including a porous film,
wherein the porous film has a porosity ϵ [%] and an air permeability t [sec/100 cc] which satisfy formulae of:

$$t=a\times Ln(\epsilon)-4.02a+100$$

and $$-1.87\times1010\times S-4.96\leq a\leq-40$$

wherein S is the area density of the positive electrode active material layer [mg/cm²] and Ln is natural logarithm.

2. The battery according to claim 1, wherein the positive electrode active material layer has an area density less than or equal to 30 mg/cm².

3. The battery according to claim 1, wherein the positive electrode active material layer has an area density less than or equal to 50 mg/cm².

4. The battery according to claim 1, wherein the positive electrode active material layer includes a positive electrode active material, and wherein the positive electrode active material includes at least one compound selected from the group consisting of: (a) a lithium nickel composite oxide having nickel as a main component, (b) a lithium nickel cobalt manganese composite oxide, (c) a lithium manganese composite oxide having a spinel structure, and (d) a lithium iron phosphate compound having an olivine structure.

5. The battery according to claim 4, wherein the lithium nickel composite oxide or the lithium nickel cobalt manganese composite oxide has a layer structure.

6. The battery according to claim 4, wherein the lithium nickel composite oxide or the lithium nickel cobalt manganese composite oxide includes a halogen element.

7. The battery according to claim 4, wherein the lithium nickel composite oxide includes nickel at greater than or equal to 50% by molar fraction.

8. The battery according to claim 4, wherein the lithium nickel cobalt manganese composite oxide includes nickel at less than or equal to 50% by molar fraction.

9. The battery according to claim 4, wherein
the lithium nickel composite oxide having nickel as a main component includes at least one composite oxide represented by the following formula (1):

$$Li_xNi_yCo_zM1_{(1-y-z)}O_b \quad (1)$$

wherein M1 represents at least one element selected from the group consisting of boron (B), magnesium (Mg), aluminum (Al), silicon (Si), phosphorus (P), sulfur (S), titanium (Ti), chromium (Cr), manganese (Mn), iron (Fe), copper (Cu), zinc (Zn), gallium (Ga), germanium (Ge), yttrium (Y), zirconium (Zr), molybdenum (Mo), silver (Ag), barium (Ba), tungsten (W), indium (In), tin (Sn), lead (Pb) and antimony (Sb);
wherein x, y, z and b are values within ranges of $0.8<x\le1.2$, $0.5\le y\le1.0$, $0\le z\le0.5$, $y+z\le1$ and $1.8\le b\le2.2$; and
wherein a composition of lithium varies depending on the charging and discharging state, and wherein x indicates a value in a fully-discharged state.

10. The battery according to claim 4, wherein
the lithium nickel cobalt manganese composite oxide includes at least one composite oxide represented by the following formula (2):

$$Li_fNi_gCo_iMn_{(1-g-i-h)}M2_hO_{(2-j)} \quad (2)$$

wherein M2 represents at least one element selected from the group consisting of magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr) and tungsten (W);
wherein f, g, h, j and i are values within ranges of $0.8\le f\le1.2$, $0<g\le0.5$, $0\le h\le0.5$, $g+h+i<1$, $-0.1\le j\le0.2$ and $0<i\le0.5$; and
wherein a composition of lithium varies depending on the charging and discharging state, and wherein f indicates a value in a fully-discharged state.

11. The battery according to claim 4, wherein
the lithium manganese composite oxide includes at least one composite oxide represented by the following formula (3):

$$Li_vNi_{i(2-w)}M3_wO_s \quad (3)$$

wherein M3 represents at least one element selected from the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W);
wherein v, w and s are values within ranges of $0.9\le v\le1.1$, $0\le w\le0.6$ and $3.7\le s\le4.1$; and
wherein a composition of lithium varies depending on the charging and discharging state, and wherein v indicates a value in a fully-discharged state.

12. The battery according to claim 4, wherein
the lithium iron phosphate compound includes at least one phosphate compound represented by the following formula (4):

$$Li_uFe_rM4_{(1-r)}PO_4 \quad (4)$$

wherein M4 represents at least one element selected from the group consisting of cobalt (Co), manganese (Mn), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W) and zirconium (Zr);
wherein r and u are values within ranges of $0<r\le1$ and $0.9\le u\le1.1$; and
wherein a composition of lithium varies depending on the charging and discharging state, and wherein u indicates a value in a fully-discharged state.

13. The battery according to claim 4, wherein
the positive electrode active material contains, as the lithium nickel composite oxide having nickel as a main component, a compound of:

$$Li_xNi_{0.80}Co_{0.15}Al_{0.05}O_2$$

wherein x is a value within a range of $0.8<x\le1.2$; and
wherein a composition of lithium varies depending on the charging and discharging state, and x indicates a value in a fully-discharged state; and
wherein a content of $Li_xNi_{0.80}CO_{0.15}Al_{0.05}O_2$ is 80% by mass or more and 98% by mass or less of a total mass of the positive electrode active material.

14. The battery according to claim 4, wherein
the positive electrode active material is a mixture of the lithium nickel cobalt manganese composite oxide and the lithium manganese composite oxide, and
a mass ratio of a mass of the lithium nickel cobalt manganese composite oxide:a mass of the lithium manganese composite oxide in the mixture is in a range of from 5:5 to 9:1.

15. The battery according to claim 4, wherein the positive electrode active material includes:
the lithium nickel composite oxide having nickel as a main component, or
a mixture of the lithium nickel composite oxide having nickel as a main component and the lithium manganese composite oxide, and
wherein a mass ratio of the lithium nickel composite oxide having nickel as a main component and the lithium manganese composite oxide in the positive electrode active material is in a range from 5:5 to 10:0.

16. The battery according to claim 1, wherein the separator further includes a surface layer including particles and a resin, and wherein the surface layer is provided on at least one surface of the porous film.

17. The battery according to claim 1, wherein the porous film is a polyolefin resin film.

18. The battery according to claim 1, wherein the separator has a thickness of 3 um or more and 18 um or less.

19. The battery according to claim 1, wherein the negative electrode includes at least one compound selected from the group consisting of carbon, silicon and tin.

20. The battery according to claim 1, wherein the negative electrode includes a silicon alloy, wherein the silicon alloy includes at least one element selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chromium (Cr).

21. The battery according to claim 1, wherein the negative electrode includes a tin compound or a silicon compound, and wherein the tin compound or silicon compound includes one or both of oxygen (O) and carbon (C).

22. The battery according to claim 1, further comprising a gel electrolyte between the positive electrode and the negative electrode, wherein the gel electrolyte includes a non-aqueous electrolyte solution held by a polymer compound.

23. A battery pack comprising:
the battery according to claim 1,
a control unit configured to control the battery, and
an exterior configured to contain the battery.

24. An electronic apparatus, comprising:
the battery according to claim 1,
wherein the electronic apparatus is configured to receive electricity supply from the battery.

25. An electric vehicle comprising:
the battery according to claim 1,
a converter configured to receive electricity supply from the battery and convert the electricity into driving force for vehicle.

26. An electric vehicle according to claim 25, further comprising a controller configured to process information on vehicle control on the basis of information on the battery.

27. An electrical storage apparatus, comprising:
the battery according to claim 1,
wherein the electrical storage apparatus is configured to provide electricity to an electronic apparatus connected to the battery.

28. The electrical storage apparatus according to claim 27, further comprising:
an electricity information controlling device configured to transmit and receive signals via a network to and from other apparatus,
wherein the electrical storage apparatus is configured to control charge and discharge of the battery on the basis of information that the electricity information controlling device receives.

29. An electricity system, configured to
receive electricity supply from the battery according to claim 1; or
provide electricity from at least one of a power generating device and a power network to the battery.

* * * * *

UNITED STATES PATENT AND TRADEMARK OFFICE
CERTIFICATE OF CORRECTION

PATENT NO. : 9,548,486 B2
APPLICATION NO. : 15/218662
DATED : January 17, 2017
INVENTOR(S) : Tomohiro Abe et al.

Page 1 of 1

It is certified that error appears in the above-identified patent and that said Letters Patent is hereby corrected as shown below:

In the Claims

In Column 38, Line 43 (Claim 1), replace "$-1.87 \times 1010 \times S\text{-}4.96 \leq a \leq -40$" with "$-1.87 \times 10^{10} 10 \times S^{-4.96} \leq a \leq -40$.".

In Column 38, Line 44 (Claim 1), replace "the area density" with "an area density".

In Column 38, Line 48 (Claim 2), replace "less" with "more".

In Column 39, Line 22 (Claim 9), replace "$0.8 < x \leq 1.2, 0.5 \leq y \leq 1.0, 0 \leq Z \leq 0.5, y+z \leq 1$ and $1.8 \leq b \leq 2.2$" with "$0.8 < x \leq 1.2, 0.5 \leq y \leq 1.0, 0 \leq z \leq 0.5, y+z \leq 1$ and $1.8 \leq b \leq 2.2$".

In Column 39, Lines 24-25 (Claim 9), replace "the charging and discharging state" with "a charging and discharging state".

In Column 39, Lines 42-43 (Claim 10), replace "the charging and discharging state" with "a charging and discharging state".

In Column 39, Line 50 (Claim 11), replace "$Li_v N_{i(2-w)} M3_w O_s$" with "$Li_v Mn_{(2-w)} M3_w O_s$".

In Column 39, Lines 59-60 (Claim 11), replace "the charging and discharging state" with "a charging and discharging state".

In Column 40, Lines 9-10 (Claim 12), replace "the charging and discharging state" with "a charging and discharging state".

In Column 40, Lines 20-21 (Claim 13), replace "the charging and discharging state" with "a charging and discharging state".

Signed and Sealed this
Nineteenth Day of May, 2020

Andrei Iancu
*Director of the United States Patent and Trademark Office*